United States Patent [19]

Stamberger

[11] Patent Number: 4,524,157

[45] Date of Patent: Jun. 18, 1985

[54] ADDUCTS AND POLYMER-POLYOLS USEFUL IN THE PREPARATION OF IMPROVED PLASTICS, INCLUDING POLYURETHANE FOAMS, ELASTOMERS AND THE LIKE

[75] Inventor: Paul Stamberger, Baltimore, Md.

[73] Assignee: Union Carbide Corporation, Danbury, Conn.

[21] Appl. No.: 501,693

[22] Filed: Jun. 6, 1983

Related U.S. Application Data

[62] Division of Ser. No. 279,318, Jul. 1, 1981.

[51] Int. Cl.$^3$ ............................................. C08G 18/14
[52] U.S. Cl. .................................. 521/156; 521/157; 528/49; 528/73; 528/75; 528/76; 528/77; 528/80; 528/81; 528/83
[58] Field of Search ................... 521/156, 157; 528/49, 528/73, 75, 76, 77, 80, 81, 83

[56] References Cited

U.S. PATENT DOCUMENTS

| | | | |
|---|---|---|---|
| 2,802,795 | 8/1957 | Simon et al. | 521/157 |
| 2,999,823 | 9/1961 | Dombrow | 521/157 |
| 3,431,223 | 3/1969 | Reymore et al. | 521/157 |

*Primary Examiner*—Maurice J. Welsh
*Attorney, Agent, or Firm*—Donald C. Simpson; Paul W. Leuzzi, II

[57] ABSTRACT

Adducts and improved polymer-polyols, both useful in the production of polyurethane foams and other synthetic materials are provided, as well as synthetic end products. The adducts are produced by combining polyols and compounds having carboxylic carbon atoms and/or epoxy groups.

9 Claims, No Drawings

ADDUCTS AND POLYMER-POLYOLS USEFUL IN THE PREPARATION OF IMPROVED PLASTICS, INCLUDING POLYURETHANE FOAMS, ELASTOMERS AND THE LIKE

RELATED APPLICATIONS

This application is a division of my copending U.S. application Ser. No. 279,318 filed July 1, 1981.

FIELD OF THE INVENTION

The present invention relates to improvement of the physical properties of polyurethanes. Polyols having characteristics tailored to the production of improved polyurethanes are provided.

More specifically, the present invention relates to novel modified polyols, designated hereinafter as adducts, which are useful reactants for producing a wide variety of synthetic plastic and elastic products. The adducts of the invention may be used, for example, to produce cellular products, films, coatings, and cast or molded articles, such as, but not limited to, polyurethanes. Where cellular or microporous articles are produced, significant improvements may be obtained in the load bearing characteristics, tensile strength, and stability of cell structure of the foams.

In one particularly useful aspect of the invention, the adducts are employed in the production of polyurethanes, especially cellular polyurethanes. Cellular polyurethane foams constitute a broad class of polymeric materials having physical characteristics ranging from rigid to elastic-rubbery structure. The polymers are produced through the interaction of a polyfunctional isocyanate with a polyfunctional chemical compound having an active hydrogen in its structure such as a polyester, polyesteramide, polyether or a mixture of two or more such materials. The active-hydrogen-containing material is generally a liquid, or a solid capable of being melted at a relatively low temperature. The materials conventionally used contain hydroxyl groups as the radicals having the active hydrogen and are generally termed "polyols."

Despite the variety of physical and chemical properties obtainable by proper selection of the polyisocyanate and the polyol as well as by controlling the conditions under which the reaction is carried out, there are definite limitations in selecting components for optimization of desirable properties in the resulting product. One of the most significant of such limitations arises from the fact that the polyol must be sufficiently liquid at the appropriate reaction temperature to permit mixing and reaction with the polyfunctional isocyanate in producing a polyurethane resin. This requirement generally results in the use of polyols of relatively low molecular weight. However, the utility of polyols of low molecular weight is generally limited to producing rigid products. The use of higher molecular weight components is attended by a variety of other difficulties including handling and compounding problems. For example, polyol viscosity may be excessively high.

One known technique for producing polyurethanes with better properties incorporating higher-molecular weight components while minimizing the disadvantages mentioned above, involves employing polymer-polyols in place of or in conjunction with simple polyols for reaction with polyisocyanates to produce polyurethanes.

However, the stability of polymer-polyols generally decreases with decreasing molecular weight of the polyols used to make them, and it is difficult to avoid using relatively low molecular-weight polyols for the reasons discussed above. Instability of polymer-polyols may lead to breakdown of the polymer-polyol dispersion during preparation and storage, resulting in coagulation. As is known in the art, it is not possible to make acceptable products with coagulated polymer-polyols, because mixing and homogeneous reaction of the reactants cannot practicably be achieved.

Also, among the polymer-polyols of greatest commercial significance have been those formed as reaction products of styrene, acrylonitrile and a polyol. There are several potential disadvantages to such systems. It is known that polymers containing acrylonitrile as a major component tend to become discolored during cure, probably because of the exothermic nature of the reaction during polyurethane formation. It is also known that styrene, when substituted for a major portion of the acrylonitrile, will prevent discoloration. However, it is normally difficult to employ high styrene-acrylonitrile ratios because the stability of reaction mixtures containing polymer-polyols generally decreases with increasing styrene content. The instability similarly can lead to difficulties in making the polymer-polyol dispersion or in breakdown after the polymer-polyol dispersion is made, resulting in coagulation. As a consequence of the above difficulties, commercial operations have often been constrained to using relatively high acrylonitrile-styrene ratios and making products in which foam discoloration was not an important consideration.

It would be desirable to provide improved techniques for producing polyurethane foams incorporating higher molecular weight components, while avoiding problems such as foam discoloration and coagulation of the polymer-polyol dispersions. Incorporation of higher molecular weight components in the reaction mixtures would lead to higher indentation load bearing capacity (hereinafter "ILD"), tensile strength (hereinafter "TES"), and flexibility of the final products, the benefits of such improved properties being well known in the art. Improvements in these important foam properties in turn would permit reduction of the foam density needed to achieve a given level of foam strength (e.g., ILD and TES), permitting reduction in the amount of polymer needed to produce a slab of foam having a given size, as well as reducing the unit volume weight of the product. In view of the widespread use of polyurethane foam materials in automobiles, and the current pressure to reduce the weight of automobile components wherever possible, production of polyurethane foams having a given ILD and TES at reduced weight is an important continuing goal in the polyurethane industry. The products discussed above should be useful in other fields as well, such as in the production of slab stock for use by the furniture industry in seat cushions, mattresses and a variety of other products.

The adducts of the invention and polymer-polyols optionally prepared from them may be advantageously employed to improve other types of products besides polyurethane foams, including but not limited to solid polyurethane products, and polyester products. Articles with improved physical properties (e.g., ILD and TES) may be produced by the practice of the invention directly without the use of polymer-polyols. Additionally, when incorporated in polymer-polyols the adducts are believed to act as protective colloids, preventing agglomeration of polymer particles and thus adverting coagulation. Improvements in the ultimate products can be expected, since improvements in the stability of polymer-polyols will produce more uniform products, with better physical properties.

DESCRIPTION OF THE PRIOR ART

The basic polymer-polyol technology is disclosed in Stamberger U.S. Pat. No. Re. 28,715 and U.S. Pat. No. Re. 29,118. Stamberger U.S. Pat. No. Re. 29,118 discloses polymer-polyols comprising (1) a relatively high-molecular weight film-forming polymer having radicals which are reactive with the —N=C=O radicals of the isocyanate used to form the polyurethane, and (2) a reactive solvent (such as a polyol) which is a solvent or dispersing medium for the polymer, and which also contains radicals which are reactive with the isocyanato group. The list of reactive monomers to be polymerized in situ in the polyol reactive solvent includes itaconic acid, maleic acid and fumaric acid. However, U.S. Pat. No. Re. 29,118 fails to specify the production of adducts by reaction of these carboxylic acids with the polyol. For example, the patent does not discuss the benefits obtainable by incorporating half-esters in polymer-polyols. (Half-esters comprise adducts formed by reaction between a polyol and a polycarboxylic acid or anhydride, having a substantial percentage of free carboxyl groups based on the total amount of carboxylic carbon atoms in the acid or anhydride which was used). While examples 49 and 50 disclose the use of polyesters having acid numbers of 44 and 11 respectively for producing polymer-polyols, there is no reference to the importance of polyol-dibasic carboxylic acid adducts having acid numbers corresponding to half-esters, especially acid numbers ranging from about 12 to 7, nor is there any suggestion of using these products to produce polyurethanes directly without first incorporating them in polymer-polyols. Also, the polyesters in U.S. Pat. No. Re. 29,118 Examples 49 and 50 were produced by reaction of a dibasic carboxylic acid with a very low molecular weight glycol (ethylene glycol) rather than a polyol as defined in and necessary for practice under the present invention. Polyols according to the invention must have an average molecular weight of at least about 500 grams per mole, preferably at least about 1,000 grams per mole, in order to produce adducts and polymer-polyols of acceptable quality. Stamberger U.S. Pat. No. Re. 28,715 contains similar disclosure (see Examples 46 and 47).

Ramlow U.S. Pat. No. 3,953,393 discloses the production of polymer-polyols which may be used to produce polyurethanes, such as polyurethane foams, by the in situ polymerization of a vinyl monomer in an unsaturated polyol in the presence of a free radical catalyst. The unsaturated polyol may be prepared by reaction of any conventional polyol with an organic compound having both ethylenic unsaturation and a hydroxyl, carboxyl or epoxy group. The organic compounds which can be used include unsaturated polycarboxylic acids and anhydrides such as maleic acid and anhydride, fumaric acid and anhydride, crotonic anhydride, propenyl succinic anhydride, halogenated maleic acids and anhydrides, and usaturated epoxides such as 1-vinylcyclohexane-3,4-epoxide, butadiene monoxide, vinyl glycidyl ether, glycidyl methacrylate and allyl glycidyl ether. The patent discloses that where polycarboxylic acids are used, it is necessary to react any remaining free carboxylic acid groups with an alkylene oxide after forming the modified polyol. It is stated that the final acid number of the modified polyol should be less than or equal to one. Other patents of similar relevance include U.S. Pat. No. 3,652,639 (Pizzini), U.S. Pat. No. 3,950,317 (Patton, Jr.) and U.S. Pat. No. Re. 29,014 (Pizzini). U.S. Pat. No. 3,931,450 (Patton, Jr.), U.S. Pat. No. 4,014,846 (Ramlow), and U.S. Pat. No. 4,093,573 (Ramlow), are of similar relevance except that they indicate that neutralization of free carboxyl groups is "preferred" rather than "necessary."

U.S. Pat. No. 4,144,395 (Murphy), is particularly related to the production of polyether-ester polyols prepared by reaction of an alkylene oxide, a polyether polyol and a polycarboxylic acid anhydride. The amount of alkylene oxide employed is such that the acid number of the product is reduced to 5 or less, and preferably to 1 or less. Murphy discloses half-ester adducts produced by the reaction of a polyol with a polycarboxylic acid anhydride, but Murphy also teaches that such half ester adducts are merely intermediates which must be reacted with an alkylene oxide to reduce the KOH value at least to 5 or less and preferably to 1 or less. Murphy teaches against any use of a half-ester adduct to produce polyurethane products, either directly by reaction with a polyisocyanate, or indirectly by incorporation in a polymer-polyol followed by reaction of the adduct-containing polymer-polyol with a polyisocyanate. See similarly U.S. Pat. No. 3,459,733 (Byrd); U.S. Pat. No. 3,585,185 (Levis); U.S. Pat. No. 3,639,541 (Austin); and U.S. Pat. No. 3,639,542 (Pizzini).

Other patents which disclose producing adducts of a polyol and a polycarboxylic acid, which then are reacted with an epoxide to yield an adduct in which substantially all free carboxyl groups are neutralized, include Japanese Kokai No. 48/101494/73, Japanese Kokai No. 48/101498/73, British Pat. No. 1,126,025, and British Pat. No. 1,217,005.

Japanese Pat. No. 52/005887 (Laid-Open No. 5887/1977), discloses production of a modified polyol by reacting a mixture of a saturated dibasic carboxylic acid and an unsaturated dibasic carboxylic acid with a polyol, in which the molar ratio of the saturated dibasic carboxylic acid to the unsaturated dibasic carboxylic acid ranges from 95:5 to 50:50, to produce a "polyester." The modified polyol may be used to produce a polymer-polyol, which then can be used to produce a polyurethane foam. There is no discussion of acid numbers except in the Examples, which indicate that the carboxyl groups in the final products were nearly completely neutralized. Another patent, U.S. Pat. No. 4,148,840 (Shah), which is of general relevance to the polymer-polyol art, includes a statement which refers to Japanese Pat. No. 52/005887 (column 10, lines 20-26). Neither the meaning nor the accuracy of this statement is clear.

U.S. Pat. No. 4,198,488 (Drake), discloses polymer-polyols produced as reaction products of (1) an organic polyol; and (2) an interpolymer of a minor amount of polymerized ethylenically unsaturated dicarboxylic acid anhydride, such as maleic anhydride, and a major amount of at least one different polymerized ethylenically unsaturated monomer. It is stated that polyurethane foams may be produced. The patent notes that acid numbers in the polymer-polyols in excess of about 1.5 are undesirable.

While the above-discussed prior art has in general disclosed reaction products of polyols with polycarboxylic acids and anhydrides, there appears to be no prior art discussion of the incorporation in polymer-polyols and polyurethanes of half-ester adducts in which at least one of the carboxylic carbon atoms remains unreacted. To the contrary, the prior art uniformly teaches that neutralization of unreacted carboxyl groups is preferred, if not required. The prior art also has failed to disclose the utility of half-ester adducts both for direct production of polymerized products (i.e., by reaction with a polyisocyanate and expanding by conventional techniques to produce a polyurethane foam), or for incorporation into useful polymer-polyols which can be similarly used to produce, e.g., polyurethane foam products.

U.S. Pat. No. 2,996,551 (De Groote), discloses adducts produced by first reacting a polyol with a monoepoxide such as propylene oxide to produce an intermediate, and then reacting the intermediate with a polyepoxide. While the patent notes that the products can be used as active-OH reactants, neither polyurethanes nor polyurethane foams are mentioned. Also, there is no disclosure of reacting a polyol with a polyepoxide in such a manner that at least one of the epoxy groups remain unreacted.

GENERAL DESCRIPTION OF THE INVENTION

It has been found, according to the present invention, that improved high molecular weight elastic, plastic, cellular and microcellular products including polyurethane products, and in particular polyurethane foams, may be produced by employing and incorporating as an agent for co-reaction with a polyisocyanate, the specially-produced adduct of the invention. In some embodiments it may be preferable to employ an adduct which is not itself reactive with the polyisocyanate, but which nevertheless acts during the polyurethane formation reaction, as a protective colloid, preventing coagulation of reaction mixtures, to improve the properties of the product. The adducts of the invention, which will be discussed in detail below, may be combined in undiluted form directly with a polyisocyanate (and optionally another polyol) to produce a polyurethane. Alternatively the adducts may be used to produce improved polymer-polyols which are effective in the production of polyurethanes. In other embodiments, the adducts and polymer-polyols of the invention may be used in producing polymer products other than polyurethanes, such as polyesters. The invention includes adducts, methods of producing adducts, polyurethanes incorporating adducts, methods of producing polyurethanes incorporating adducts, polymer-polyols produced incorporating adducts, methods of producing polymer-polyols incorporating adducts, polyurethanes produced incorporating polymer-polyols of the invention, and methods of producing polyurethanes incorporating polymer-polyols of the invention.

OBJECTS AND INVENTION SUMMARY

It is an object of this invention to provide adducts which are useful in producing improved high molecular weight elastic, plastic, cellular and microcellular products including polyurethane products and in particular, polyurethane foams.

It is also an object of this invention to provide methods of producing the adducts of the invention.

It is another object of this invention to provide polyurethane products including polyurethane foams, incorporating the adducts of the invention.

It is yet another object of this invention to provide methods of producing polyurethane products including polyurethane foams, incorporating the adducts of the invention.

It is a further object of this invention to provide improved polymer-polyols incorporating the adducts of the invention.

It is another object of this invention to produce stable polymer-polyols with low acrylonitrile/styrene ratios.

It is an additional object of this invention to produce stable polymer-polyols which yield polyurethane foams substantially free of discoloration.

It is also an object of this invention to improve the dispersion stability, lower the viscosity and increase the polymer content of polymer-polyols.

It is an additional object of this invention to provide methods of producing improved polymer-polyols incorporating the adducts of the invention.

It is still another object of this invention to provide polyurethane products including polyurethane foams incorporating the improved polymer-polyols of the invention.

It is yet a further object of this invention to provide methods of producing polyurethane products including polyurethane foams incorporating the improved polymer-polyols of the invention.

These and other objects of the present invention will become more apparent upon reference to the following detailed description and the appended claims.

In accordance with the present invention, adducts and improved polymer-polyols, both useful in the production of synthetic products including but not limited to polyurethanes, such as polyurethane foams, are provided, as well as the synthetic products themselves.

In one embodiment, the invention provides adducts formed by reaction of a polyol with a co-reactant selected from the group consisting of: (A) a half-ester coreactant formed by 1:1 molar reaction between: (1) at least one polyhydroxyhydrocarbon having a molecular weight below about 200, and (2) at least one polycarboxylic compound selected from the group consisting of dicarboxylic acids, dicarboxylic acid anhydrides, polycarboxylic acids having at least three carboxylic carbon atoms and polycarboxylic anhydrides having at least three carboxylic carbon atoms, in which at least one of the carboxylic carbon atoms of the polycarboxylic compound remains unreacted after the 1:1 molar reaction; (B) an epoxy co-reactant selected from the group consisting of diepoxides, polyepoxides having more than two epoxy groups and mixtures, in which at least one of the epoxy groups in the epoxy co-reactant remains unreacted after reaction with the polyol; or (C) a half-ester co-reactant formed by 1:1 molar reaction between: (1) at least one polycarboxylic compound selected from the group consisting of dicarboxylic acids, dicarboxylic acid anhydrides, polycarboxylic acids having at least three carboxylic carbon atoms and polycarboxylic anhydrides having at least three carboxylic carbon atoms, and (2) at least one epoxy compound selected from the group consisting of diepoxides and polyepoxides having at least three epoxy groups, in which at least one of the epoxy groups of the epoxy compound remains unreacted after the 1:1 molar reaction.

In another embodiment, the invention provides improved polymer-polyols comprising a mixture of: (A) a minor percentage by weight of an adduct formed by reaction of a first polyol with a co-reactant selected from the group consisting of (1) a polycarboxylic co-reactant having at least three carboxylic carbon atoms selected from the group consisting of polycarboxylic acids, polycarboxylic acid anhydrides and mixtures thereof, in which at least one of the carboxylic carbon atoms of the co-reactant remains unreacted after reaction with the polyol; (2) a half-ester co-reactant formed by 1:1 molar reaction between at least one polyhydroxyhydrocarbon having a molecular weight below about 200 and at least one polycarboxylic compound selected from the group consisting of dicarboxylic acids, dicarboxylic acid anhydrides, polycarboxylic acids having at least three carboxylic carbon atoms and polycarboxylic anhydrides having at least three carboxylic carbon atoms, in which at least one of the carboxylic carbon atoms of the polycarboxylic compound remains unreacted after the 1:1 molar reaction; (3) an epoxy co-reactant selected from the group consisting of diepoxides, polyepoxides having more than two epoxy groups and mixtures, in which at least one of the epoxy groups in the epoxy co-reactant remains unreacted after reaction with the polyol; or (4) a half-ester co-reactant formed by 1:1 molar reaction between (a) at least one polycarboxylic compound selected from the group consisting of dicarboxylic acids, dicarboxylic acid anhydrides, polycarboxylic acids having at least three carboxylic carbon atoms and polycarboxylic anhydrides having at least three carboxylic carbon atoms, and (b) at least one epoxy compound selected from the group consisting of diepoxides and polyepoxides having at least three epoxy groups, in which at least one of the epoxy groups of the epoxy compound remains unreacted after the 1:1 molar reaction; (B) a second polyol; and (C) at least one ethylenically unsaturated monomer which is reactive with free hydroxyl groups of the first and second polyols, in which (C) has been polymerized in (A) and (B) by free radical addition polymerization to a substantially linear polymer having a molecular weight of at least about 5,000 to provide a liquid stable dispersion of polymer-polyol.

In an additional embodiment, the invention provides improved polyurethane products including polyurethane foams, produced using the adducts and improved polymer-polyols of the invention.

DETAILED DESCRIPTION OF THE INVENTION

According to the present invention, adducts are produced which are effective in producing polyurethane products and particularly polyurethane foams.

In one embodiment of the invention, adducts are produced by reacting (A) a polyol, and (B) at least one compound selected from the group consisting of dicarboxylic acids and anhydrides, polycarboxylic acids having more than two carboxylic carbon atoms and the corresponding anhydrides, and epoxides including diepoxides and polyepoxides having more than two epoxy groups.

A wide range of polyols and the like can be used. Among the polyols which can be employed are one or more polyols from the following classes of compositions. (Minor amounts of polyhydroxyalkanes can be present).

(a) Hydroxyl-terminated polyesters;
(b) Alkylene oxides of polyhydroxyalkanes;
(c) Trialkanolamines and alkylene oxide adducts thereof;
(d) Alcohols derived from mono- and polyamines by addition of alkylene oxides;
(e) Non-reducing sugars and sugar derivatives and alkylene oxide adducts thereof;
(f) Alkylene oxide adducts of aromatic amine/phenol/aldehyde condensation products;
(g) Alkylene oxide adducts of phosphorus and polyphosphorus acids;
(h) Polyphenols and alkylene oxide adducts thereof;
(i) Polytetramethylene glycols, and the like.

Particularly preferred polyols include poly(oxypropylene)glycols, triols and higher functionality polyols, poly(oxybutylene)glycols, triols and higher functionality polyols, and poly(oxypropylene-oxyethylene)polyols, similarly including glycols, triols and higher-functionality polyols. In the latter class of polyols, the oxyethylene content of the polyol is preferably less than 80%, most preferably less than 60% of the total. When used, ethylene oxide can be included in any fashion along the polyol molecule chains, i.e., as internal blocks, terminal blocks, and/or in random patterns.

Limited unsaturation in the polyol used does not adversely affect the operation of the invention, unless the polyol has so much unsaturation that it is in the form of a highly crosslinked polymer or gel.

The polyols employed can have hydroxyl numbers which vary over a wide range. In general, the hydroxyl numbers of the polyols employed can range from about 20, and lower, to about 400, and higher, preferably from about 30 to about 300, and most preferably, from about 35 to about 200. The hydroxyl number is defined as the number of milligrams of potassium hydroxide required for the complete hydrolysis of the fully acetylated derivative prepared from 1 gram of polyol. The hydroxyl number can also be computed by the equation:

$$OH = \frac{56.1 \times 1000 \times F}{M.W.}$$

where
OH = hydroxyl number of the polyol
F = functionality (average number of hydroxyl groups per molecule of polyol)
M.W. = molecular weight of the polyol.

The exact polyol employed depends upon the end use of the polyurethane product to be produced. For example, in the case of foamed reaction products, the hydroxyl number is selected properly to result in flexible, semi-flexible, or rigid foams. The above polyols preferably possess a hydroxyl number of from about 200 to about 400 when employed in rigid foam formulations, from about 70 to about 150 for semiflexible foams, and from about 20 to about 70 when employed in flexible foam formulations. Such limits are not intended to be restrictive, but are merely illustrative of preferred polyols for particular applications.

The average molecular weight of the polyols used can range from about 500 grams per mole up to 9,000 grams per mole or more; preferably the average molecular weight ranges from about 1,000–4,000 grams per mole. Polyol average molecular weight has great influence on the character of the end products. The flexibility of polyurethane foams increases as the polyol molecular weight increases. As the polyol molecular weight decreases, more polyisocyanate is needed to produce an acceptable foam.

Compounds useful as co-reactants in the present invention with moieties which are reactive with the polyol include dicarboxylic acids, dicarboxylic acid anhydrides and diepoxides. These compounds may be aliphatic, cyclic or aromatic, and may be saturated or unsaturated. Compounds having more than two functionalities such as tricarboxylic acids and triepoxides may also be used. Compounds having two or more functionalities reactive with the hydroxyl groups of the polyol and additionally having one or more hydroxyl groups, such as hydroxycarboxylic acids, may also be used. It is theorized that reactions occur between the polyol and the reactive compound or compounds which are combined with it. In the case of dicarboxylic acids and anhydrides this has been substantiated using infrared spectroscopy and NMR (nuclear magnetic resonance). However, the polyol and co-reactant may also interact to produce a protective colloid which may not strictly be a single reaction product.

Carboxylic compounds which may be used include, as representative examples, maleic acid, adipic acid, succinic acid, itaconic acid, sebacic acid, phthalic acid, azelaic acid, 4-carboxyheptanedioic acid and the corresponding anhydrides. The anhydrides, in particular maleic anhydride and phthalic anhydride, are preferred.

Epoxy compounds which may be used include, as representative examples, 3,4-epoxycyclohexylmethyl-3,4-epoxy-cyclohexane carboxylate, 1,4-butanediol diglycidyl ether, vinyl cyclohexene dioxide, bis(3,4-epoxycyclohexyl)adipate, limonene dioxide, and 2-(3,4-epoxycyclohexyl-5,5-spiro-3,4-epoxy)cyclohexane-meta-dioxane. Limonene dioxide and 3,4-epoxycyclohexylmethyl-3,4-epoxy-cyclohexane carboxylate are the preferred epoxy compounds for use.

Suitable epoxy compounds are commercially available, for example, from the Union Carbide Corporation (New York) under the trade name BAKELITE. Additional sources of suitable epoxy compounds include the Viking Chemical Company (Minneapolis).

The adducts may be produced by reacting the polyol (A) with the polyol-reactive compound (B) in a molar ratio ranging from about 1:1 to 1:2. The discussion below refers to an exemplary mixture having a 1:1 molar ratio of hydroxy and carboxy groups. The compound (B) should be added to the polyol (A) in a vessel which is continuously flushed with nitrogen and equipped with stirring means, temperature control, reflux and heat source. The compound (B) should be stirred to dissolve it in the polyol at a temperature ranging from about 70° to 150° C.; preferably at about 70° to 120° C., and most preferably at about 70° C. The temperature should then be gradually increased to about 160° to 180° C., preferably about 170° C. Since extended heating at such temperatures can result in reaction of all reactive functionalities of the compound (B), the progress of the reaction is chemically monitored and reaction is stopped by cooling when the desired stage of reaction is reached. Where carboxylic compounds are used, the reaction is complete when the KOH equivalent of the reaction product, as determined by the KOH titration test to be detailed below, is reduced by about ⅓ of the original value. This indicates that a "half-ester" has been produced, in which a substantial percentage of the carboxylic carbons of the carboxylic compound have reacted with the polyol but in which a significant percentage also remain unreacted. Where dicarboxylic acids or anhyrides are used, the KOH value should be reduced to below about 16, preferably to between about 12 and 7. Acid equivalents higher than about 12 indicate that the dicarboxylic acid or anhydride remains substantially unreacted; acid equivalents less than about 7 indicate that the second half of the carboxylic carbons of the dicarboxylic acid or anhydride have begun to react with the polyol. Full esters having substantially no free carboxyl groups may be produced (as needed in later embodiments detailed below) by merely continuing the reaction until the KOH equivalent is reduced substantially to zero.

Usually when a dicarboxylic anhydride is allowed to react with a polyol, reaction at 160°-180° C. for 2-3 hours produces a half-ester. The free carboxyl group formed when the anhydride undergoes ring opening does not readily react with the polyol, due to steric hindrance. However, further heating for about 6 additional hours or longer causes the free carboxyl groups to react, yielding a fully esterified product. While there may be excess hydroxyl groups in the polyol which remain unreacted, substantially all of the carboxyl carbon atoms from the anhydride are then bound by esterification reaction. Specific reaction times and temperatures required for particular anhydrides to produce half- and full-esters vary, and the necessary parameters may be readily established by those skilled in the art on a case-by-case basis.

Where epoxides are used as the co-reactant, similar procedures may be used and the reaction is complete when a substantial percentage of the epoxy groups of the epoxide have reacted with the polyol, but where a significant percentage remain unreacted, as determined by the pyridinium chloride test to be further explained below. These reactions are preferably carried out at a temperature of about 70°-90° C., most preferably about 70° C., for about 10 hours.

According to another important embodiment, the adducts are produced as the reaction product of (A) a polyol and (C) an intermediate formed as the reaction product of at least one compound (B) as described above, with at least one low molecular weight polyhydroxyhydrocarbon (D).

The low molecular weight polyhydroxyhydrocarbon (D) is preferably a glycol such as ethylene glycol, propylene glycol, or 1,3-butylene glycol. Ethylene glycol and 1-3,butylene glycol are the preferred low molecular weight polyhydroxyhydrocarbons. Other low molecular weight polyhydroxyhydrocarbon compounds including diols, triols, quadrols and higher-functional polyhydroxyhydrocarbon compounds may also be used. The distinction between the compounds (D) and the polyols (A) lies in their respective molecular weights. Whereas the polyols (A) normally have average molecular weights of about 500 to about 9,000, the compounds (D) have exact chemical formulas of molecular weight generally below about 200 grams per mole.

In producing the intermediate (C), the compound (B) and the compound (D) are allowed to react under conditions similar to those set forth above. Preferably, this reaction is carried out at a temperature of about 80°-100° C., most preferably about 95° C., for about 24 hours. After this intermediate (C) has been produced and, if necessary, subjected to conventional purification steps such as filtering or stripping of superfluous reactants, the intermediate (C) and the polyol (A) are reacted to produce an adduct having a low KOH or epoxy equivalent. This reaction is preferably carried out at a temperature of about 160°-180° C., most preferably about 180° C., for about 10 hours. The polyol and the intermediate are preferably combined in a molar ratio of 1:1.

According to yet another embodiment, the adducts are produced as the reaction product of (A) a polyol and (E) a half-ester intermediate formed as the reaction product of (1) at least one polycarboxylic compound selected from the group consisting of dicarboxylic acids, dicarboxylic acid anhydrides, polycarboxylic acids having at least three carboxylic carbon atoms and polycarboxylic anhydrides having at least three carboxylic carbon atoms, and (2) at least one epoxy compound selected from the group consisting of diepoxides and polyepoxides having at least three epoxy groups. The polycarboxylic and epoxy compounds mentioned above are suitable for use.

To produce the adducts, the polycarboxylic and epoxy compounds are allowed to react under conditions similar to those set forth above to produce the half-ester intermediate (E). These reactions are preferably carried out at a temperature of about 100°–140° C., preferably about 130° C. for about a half-hour. The intermediate (E) is then allowed to react with the polyol as described in the previous embodiment to produce the adduct.

The times and temperatures specified above for the various reactions are exemplary but not required. Catalysts may be added to accelerate the reactions, as taught below in the Examples, permitting use of lower temperatures and shorter reaction times. Suitable catalysts are well known in the art.

Preferably, the adducts produced according to the above embodiments are diluted with a polyol. An adduct in a reaction mixture for producing a product such as a polyurethane should constitute about 2.5–10% by weight, preferably about 5–10% and most preferably about 10% by weight of the composition. The optimum amount in a given case is best determined by experimentation.

Rather than being combined in accordance with the above embodiments directly with a polyisocyanate to produce a polyurethane, the adducts may optionally be incorporated in a polymer-polyol which is then combined with a polyisocyanate.

Polymer-polyols are well known in the art. The basic technology is disclosed in Stamberger U.S. Pat. No. Re. 28,715 and U.S. Pat. No. Re. 29,118. Generally, in order to produce a conventional polymer-polyol, an ethylenically unsaturated monomer is polymerized in situ in an appropriate polyol. The polymerization produces a stable, dispersed polymer in the polyol. The polymer dispersion, known as a polymer-polyol, can be employed as a reactant in a number of reactions (e.g., polyurethane-forming reactions) to introduce into the resultant product, as an integral part thereof, both the polyol and the dispersed polymer.

More specifically, conventional polymer-polyols may be produced by the following steps which are known in the art:

(a) Dispersing a minor amount of an ethylenically unsaturated monomer in a major amount of at least one normally liquid polyol having a molecular weight of at least about 500 and a hydroxyl number in the range of about 20 to about 600 by feeding the monomer into the polyol at a regular and continuous rate, and (b) Polymerizing said monomer in said polyol by free radical addition polymerization in the presence of a conventional free-radical catalyst to a substantially linear polymer having a molecular weight of at least about 5,000 to provide a liquid, stable dispersion of polymer-polyol having a viscosity of less than about 40,000 cps. (centipoises) at 10% polymer concentration. During this polymerization, a minor amount of graft or block polymer is inherently produced. Thus, regardless of whether or not the ethylenically unsaturated monomer itself contains radicals reactive with the isocyanato group, the reactive compositions produced always contain film-forming polymer having radicals reactive with the isocyanato group. Among ethylenically unsaturated monomers which do not have a radical reactive with the isocyanato group are styrene, methyl methacrylate and vinyl acetate; however, all of these produce, after polymerization, reactive compositions that contain a film-forming polymer having a minor amount of reactive radicals introduced from the polymerization medium and the reactive compositions react with the isocyanato group.

Preferably, the adduct is diluted significantly with a suitable polyol before addition and polymerization with the ethylenically unsaturated monomer to produce the desired adduct-modified polymer-polyol. A mixture of about 2.5 to about 10 parts, and preferably about 5 to 10 parts by weight of adduct per 100 parts of the total mixture of adduct and polyol for producing the polymer-polyol should be used. The optimum percentage to be used in a given case, however, is best determined by experimentation, because factors including the type and molecular weight of the polyol used, and the type and concentration of ethylenically unsaturated monomers to be used, affect the properties of the product polymer-polyols. The adduct, polyol and ethylenically-unsaturated monomers may be combined in any order, the important factor being dilution of the adduct by a suitable polyol prior to addition of the polyisocyanate to produce the polyurethane. Preferably, however, the adduct is first diluted with the polyol before mixing with the ethylenically-unsaturated monomers.

Polymer-polyols may be produced by polymerizing the ethylenically unsaturated monomers in the selected polyol at a temperature of from about 40° C. to 150° C. in the presence of a catalytically effective amount of a conventional free radical catalyst known to be suitable for the polymerization of ethylenically unsaturated monomers. Preferably, the monomers are fed into the polyol over about three hours while maintaining the polyol at about 130°–140° C., and the reactants are then maintained at about 140°–150° C. for an additional hour. These are preferred but optional reaction conditions.

A polyol chosen for use in producing a polymer-polyol must meet several requirements in addition to the requirements discussed above in relation to polyols in general:

(1) It must act as a solvent or dispersing medium for the film-forming polymer produced by polymerization of the ethylenically-unsaturated monomers.

(2) It must not be so reactive with the film-forming polymer as to reduce substantially the reactive radical content of either the solvent or the polymer or to form a gel or a hard infusible resin which would interfere with or even prevent the reaction with the polyisocyanate.

(3) It should form stable solutions or dispersions with the film-forming polymer which are preferably dilutable without the formation of undesirable precipitates with the components used to form the polyurethane polymer.

(4) It must be a liquid, at least at the temperature used for the reaction with the polyisocyanate.

(5) It must have at least two radicals which are reactive with the —N=C=O of the polyisocyanates so as to form a reaction product with the polyisocyanate.

Among the polyols that can be employed for producing polymer-polyols are hydroxyl-terminated polyesters, polyhydroxyalkanes, polyphenols, polyoxyalkylene polyols, or the like and the corresponding mercapto derivatives.

The monomers which may be used are the polymerizable monomers characterized in that they have at least one polymerizable ethylenically unsaturated group of the type, (C=C). The monomers can be used singly or in combination to produce homopolymer/polyol or copolymer/polyol reactive compositions.

These monomers are well known in the art and include the hydrocarbon monomers such as butadiene, isoprene, 1,4-pentadiene, 1,6-hexadiene, 1,7-octadiene, styrene, alpha-methylstyrene, methylstyrene, 2,4-dimethylstyrene, ethylstyrene, isopropylstyrene, butylstyrene, phenylstyrene, cyclohexylstyrene, benzylstyrene, and the like, substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyl diphenyl sulfide, p-vinylphenyl phenyl oxide, and the like; the acrylic and substituted acrylic monomers such as acrylic acid, methacrylic acid, methylacrylate, hydroxypropyl acrylate, 2-hydroxyethyl acrylate, 2-hydroxyethyl methacrylate, methyl methacrylate, cyclohexyl methacrylate, benzyl methacrylate, isopropyl methacrylate, hydroxypropyl methacrylate, octyl methacrylate, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, acrylonitrile, alpha-chloroacrylonitrile, substituted acrylamides including N,N-dimethylacrylamide, N,N-dibenzylacrylamide, and N-butylacrylamide acrylamide, methacrylyl formamide, and the like; the vinyl esters, vinyl ethers, vinyl ketones, etc. such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, t-butylaminoethyl methacrylate, dimethylaminoethyl methacrylate, glycidyl acrylate, allyl alcohol, glycol monesters of itaconic acid, diglycol esters of itaconic acid, methyl monoester of itaconic acid, dichlorobutadiene, vinyl pyridine, and the like. Any of the known polymerizable monomers can be used and the compounds listed above are illustrative and not restrictive of the monomers suitable for use in this invention. Any of the known chain transfer agents can be present if desired.

Illustrative of catalysts which can be used in producing polymer-polyols are the well-known free radical types of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, t-butyl peroxybenzoate, alpha,alpha'-azo-2-methyl butyronitrile, alpha,alpha'-2-methyl heptonitrile, 1,1'-azo-1-cyclohexane carbonitrile, dimethyl alpha,alpha'-azo-isobutyrate, 4,4'-azo-4-cyanopentanoic acid, azo-bisisobutyronitrile, persuccinic acid, diisopropyl peroxy dicarbonate, and the like, a mixture of catalysts may also be used.

The concentration of the catalyst can vary from about 0.001 to about 5 percent, preferably from about 0.2 to about 0.5 percent; however, any effective catalytic amount is satisfactory.

The polymerization can also be carried out with an inert organic solvent present. Illustrative thereof are toluene, benzene, acetonitrile, ethyl acetate, hexane, heptane, dicyclohexane, dioxane, acetone, N,N-dimethylformamide, and N,N-dimethylacetamide.

Acceptable polymer-polyols normally have a maximum polymer particle size ranging from about 1 to about 6 microns; preferably, from about 1 to about 3 microns; and most preferably, about 1 micron or less. Polymer-polyols having particles of maximum diameter of less than 1 micron are considered for the purposes of this invention to be on the borderline of invisibility when examined under a microscope. Polymer-polyols having particles of 1–3 microns maximum diameter are considered to be of medium size. Polymer-polyols having particles of 4–6 microns maximum diameter are considered to be of large size.

Polymer-polyols should contain from about 5 to 50% by weight of dispersed polymer. A preferable concentration is about 20 to 50% by weight. Polymer-polyols having in excess of about 50% by weight of dispersed polymer are ordinarily too viscous for practical purposes.

The adducts and polymer-polyols prepared with them can be used to produce polyurethane products, particularly polyurethane foams. Where a polymer-polyol is used, upon addition of a polyisocyanate to the polymer-polyol, the ethylenically unsaturated monomers and the adduct in the polymer-polyol both react with the isocyanato groups and are chemically and integrally bound in the resulting polyurethane. Where an adduct is directly used, preferably dissolved in a polyol, the hydroxyl groups of the polyol and adduct react with the isocyanato groups of the polyisocyanate and are chemically and integrally bound into the polyurethane.

The adducts and polymer-polyols may be used in prepolymer processes, quasi-prepolymer processes and one-shot processes as known to those skilled in the art. The polyurethanes may be further reacted with epoxy resins, cured with sulfur, peroxides or other curing agents, or otherwise reacted or modified as known to those skilled in the art. In using the one-shot process for production of polyurethanes, it is desirable to also use a silicone oil emulsifier as described in U.S. Pat. No. 2,834,748 and U.S. Pat. No. 2,917,480 (Bailey).

The isocyanates used to form the polyurethanes of the present invention must be polyfunctional. Examples of such polyisocyanates are the toluene diisocyanates, hexamethylene diisocyanates, diphenylmethane diisocyanates, naphthalene diisocyanates, triphenylmethane triisocyanates, phenylene diisocyanates, dimethyldiphenylmethane diisocyanates, triisocyanatodiphenyl ethers, et cetera, such as meta-toluene diisocyanate, 4,4'-diphenyl diisocyanate, 4,4'-diphenylene methane diisocyanate, 1,5-naphthalene diisocyanate, 4,4'-diphenyl ether diisocyanate, p-phenylene diisocyanate, ethylene diisocyanate, trimethylene diisocyanate, cyclohexylene diisocyanate, 2-chloropropane diisocyanate, xylylene diisocyanates, et cetera. A mixture of 80% 2,4-tolylene diisocyanate and 20% 2,6-tolylene diisocyanate is particularly preferred; this mixture will be referred to hereinafter as toluene diisocyanate. Other polyisocyanates which can be used will occur to those skilled in the art.

The extremely versatile nature of the invention makes possible the production of products having a wide variety of characteristics, and can effectively be used for forming not only cellular and microcellular polyurethane products, but also films, coatings, cast or molded articles, et cetera.

As is well known, cellular polyurethane products may be obtained by inducing the polyurethane reaction in the presence of a gas-producing agent or "blowing agent" such as a fluorohydrocarbon. Alternatively, the polyurethane-producing reaction may be induced in the presence of water, which reacts with isocyanate to release carbon dioxide, an effective blowing agent. An excess of the polyisocyanate should be used to compensate for the loss of polyisocyanate due to reaction with water. Since water acts indirectly to release carbon dioxide, water will be considered as a blowing agent in this invention. By this invention, in which polyurethanes and polyurethane foams are produced using the adducts and polymer-polyols discussed above, significant improvements may be obtained in the load bearing characteristics (ILD) of foam products as well as the tensile strength (TES) and stability of the foam cells.

In a preferred embodiment of the invention, styrene and acrylonitrile are copolymerized in an adduct or adduct-modified polymer-polyol of the invention and subsequently reacted with a polyisocyanate to produce a polyurethane. The polyurethane can be expanded conventionally to produce a foam.

As discussed earlier, there have been difficulties in the past with using the styrene-acrylonitrile systems for producing polyurethanes. In particular, high styrene-acrylonitrile ratios lead to instability of the reaction mixtures used to produce polymer-polyols. Production of products using low styrene-acrylonitrile ratios or acrylonitrile alone results in excessive buildup of heat from the exothermic curing reaction and causes discoloration of the product. This invention alleviates these problems, as it is possible to produce polyurethane reaction mixtures at a given solids concentration and polyol molecular weight, having high styrene-acrylonitrile ratios, without the attendant problems of dispersion instability and product discoloration. The styrene-acrylonitrile ratios according to the invention are preferably in the range from 50:50 up to 100:0; an approximately 80:20 ratio is particularly preferred. The polymer dispersions obtained according to this aspect of the invention are characterized by a minute particle size, i.e., little or no tendency to exhibit coagulation or excessive grit content.

Rather than using the adducts and polymer-polyols of the invention to produce polyurethanes, other types of polymers may be produced. For example, the adducts and polymer-polyols may be reacted with a polycarboxylic acid or anhydride (such reactants are mentioned above), to produce a polyester. While polyurethanes and polyesters have been mentioned specifically, it is to be understood that the utility of the adducts and polymer-polyols extends beyond production of these specific polymer classes, and other types of polymers may alternatively be produced.

This invention is further illustrated by the following examples, without, however, being restricted thereto. All parts are by weight, unless otherwise specified.

Four standardized polyols were utilized in the Examples:

Polyol I-Polypropylene oxide-polyethylene oxide triol made from propylene and ethylene oxides and glycerine and having a theoretical number average molecular weight of about 4700 and a hydroxyl number of about 35.9. The alkylene oxide units are present primarily in blocks and the end units are substantially all ethylene oxide units, i.e., the ethylene oxide is used to "cap" the triol. Based on its total weight, this triol contains about 14 wt% ethylene oxide. (Such a polyol is commercially available from Union Carbide under the trade name Niax 11-27).

Polyol II-Polypropylene oxide-polyethylene oxide triol made from propylene and ethylene oxides and glycerine and having a theoretical number average molecular weight of about 6,000 and a hydroxyl number of about 26.1. The alkylene oxide units are present primarily in blocks and the end units are substantially all ethylene oxide units, i.e., the ethylene oxide is used to "cap" the triol. Based on its total weight, this triol contains about 14 wt% ethylene oxide. (Such a polyol is commercially available from Union Carbide under the trade name Niax 11-34).

Polyol III-Polypropylene oxide-polyethylene oxide polyol made from propylene oxide and ethylene oxide and an 80/20 blend by weight of sorbitol and glycerine, having a theoretical number average molecular weight of about 10,800 and a hydroxyl number of about 28. The alkylene oxide units are present primarily in blocks, and the end units are substantially all ethylene oxide units, i.e., the ethylene oxide is used to "cap" the polyol. The polyol contains about 8 wt-% ethylene oxide units based on the total polyol weight. (Such a polyol is commercially available from Union Carbide under the trade name Niax 16-56).

Polyol IV-Polypropylene oxide triol made from propylene oxide and glycerine and having a theoretical number average molecular weight of about 3,000 and a hydroxyl number of about 55.4. (Such a polyol is commercially available from Union Carbide under the trade name Niax Lg-56).

The ILD and TES characteristics of foams in the Examples were measured using ASTM D1564-69 standard test methods. The ILD test basically involves measuring the pressure (pounds per square inch) necessary to compress a foam sample of standard size to a specified percentage of one of its original dimensions. The TES test basically involves compressing a foam sample of standard size to a solid film before the foam sets, and measuring the tensile strength of the film (pounds per square inch-gravity).

In carrying out the KOH titration test, the amount of unreacted carboxyl groups in a product is determined by direct titration with an alcoholic solution of one-tenth normal KOH using Methylene Blue as an indicator (pH). Unreacted carboxyl groups are calculated in units of milligrams of KOH per gram of the sample. A KOH equivalent ranging from 0 to about 3 indicates that most carboxyl groups of any carboxylic compounds used in the reactions have been reacted, e.g., with hydroxy moieties. A KOH equivalent of about 4 or greater (more particularly 7 or greater), indicates that a significant amount of free carboxyl groups remain unreacted, as is the case in half-esters.

The free epoxy content of a reaction mixture may be determined using the pyridinium hydrochloride method. A sample is reacted with an excess of pyridinium hydrochloride and the unreacted HCl is titrated with methanolic NaOH to a pink endpoint. The epoxide content is determined by calculation of the amount of pyridinium hydrochloride consumed during the reaction. In order to correct for inaccuracies due to the presence of any acid in the sample itself, an identical sample is then reacted with pyridine instead of pyridinium hydrochloride and the acid value is added to the calculation for epoxy content. (See Critchfield, F. E., Organic Functional Group Analysis; Vol. 8 in International Series of Monographs on Analytical Chemistry, (Macmillan Co., New York 1963), P. 134; and Mitchell, J., et al, Organic Analysis, Vol. 1, (Interscience Publishers, New York 1953), p. 144).

Unsaturation in an adduct or polymer-polyol may be determined using the dodecyl mercaptan method. (NMR could alternatively be used). Standard reagents including the following are prepared: (1) 25 grams of N-dodecyl mercaptan in one liter of ethanol; (2) 50 grams of potassium anhydride in one liter of ethanol; and (3) a 0.05 to 0.01 Normal iodine solution in aqueous potassium iodide.

An adduct or polymer-polyol sample weighing about 6.5 grams is added to a 250 ml iodine flask containing 50 ml of ethanol. After dissolution of the sample, 25 ml of alcoholic mercaptan solution is pipetted into the flask and neutralized with potassium hydroxide (the potassium anhydride solution). One additional milliliter of potassium anhydride is then added as a catalyst. After allowing the mixture to stand for about two minutes, the mixture is acidified with 1–2 ml of glacial acetic acid and diluted with an additional 25 ml of ethanol. The solution is titrated with the standardized iodine solution to a faint yellow endpoint. A blank is run using the same procedure, without adding adduct or polymer-polyol sample and with no potassium hydroxide. The millimoles of unsaturation per gram of the sample are calculated as follows:

$$\frac{\text{millimoles unsaturation}}{\text{gram of sample}} = \frac{(B - A)N}{W}$$

B = milliliters of iodine required to titrate blank
A = milliliters of iodine required to titrate the sample
N = Normality of the iodine solution
W = weight of the sample
(See Kohthoff and Belcher, *Volumetric Analysis,* Vol. 2, (Interscience Publishers, N.Y. 1957), pp. 389–390).

PREPARATION OF POLYURETHANE FOAMS USING POLYOLCARBOXYLIC ANHYDRIDE HALF-ESTER ADDUCTS

EXAMPLE 1

A resin reaction vessel continuously flushed with nitrogen gas and equipped with a thermometer, stirrer, reflux condenser and heat exchange means was charged with 1,500 grams polyol 1 (Niax 11-27), 49 grams maleic anhydride and 0.5 milliliters of tetra-isopropyl titanate catalyst. The components were kept at 180° C. until the hydroxy equivalent of the charge determined by KOH titration was about 8.6 milligrams per gram (about 3 hours) and the Brookfield viscosity of the half-ester adduct produced was 1,880 cps.

A foam was made from the half-ester adduct by combining 100 grams of the adduct with 1 gram of Union Carbide silicone No. 6202, 52.47 grams toluene diisocyanate, 4.5 grams water, 0.125 grams Union Carbide Niax catalyst A-6, and 0.2 grams stannous octoate, and expanding the mixture into a foam by conventional techniques.

Further trials were made and the results are shown in Table 1. Trial 1 was a control; trials 2–4 and 5–7 utilized maleic anhydride and succinic anhydride respectively (trial 2 was described above). As shown, the ILD and TES properties of the product polyurethane foams showed substantial increases in most cases as compared with the control (trial 1). The ILD and TES values in trial 2 were the best obtained in this set of trials, and the KOH value of 8.6 in trial 2 establishes that the adduct was a half-ester. The KOH value in trial 5 also establishes the presence of a half-ester, and good improvements in ILD and TES were also shown. In trials 3 and 6 the free carboxyl groups in the adduct were neutralized using propylene oxide.

TABLE 1

|  | TRIAL | | | | | | |
|---|---|---|---|---|---|---|---|
|  | 1 (Control) | 2 | 3 | 4 | 5 | 6 | 7 |
| REACTANT | None | MA | MA | MA | SA | SA | SA |
| GRAMS REACTANT/ 100 GRAMS POLYOL | None | 3.26 | 3.26 | 1.63 | 3.33 | 3.33 | 1.66 |
| CARBOXYL NEUTRALIZED WITH | — | — | PO | — | — | PO | — |
| VISCOSITY (cps) | 1,219 | 1,880 | 2,240 | 4,050 | 1,520 | 2,120 | 8,200 |
| KOH (mg/g) | 0.0 | 8.6 | 0.6 | 0.5 | 7.6 | 0.5 | 0.1 |
| FOAM DENSITY ($g/c^3$) | 2.0 | 2.3 | 2.0 | 1.9 | 2.3 | 2.1 | 1.9 |
| ILD (lbs/sq. inch) 25% | 20.0 | 37.2 | 32.8 | 28.7 | 28.2 | 27.1 | 26.0 |
| % INCREASE | — | 86.0% | 64.0% | 43.5% | 41.0% | 35.5% | 30.0% |
| 65% | 41.0 | 97.5 | 64.5 | 40.2 | 71.9 | 42.0 | 47.1 |
| % INCREASE | — | 137.8% | 57.3% | −1.95% | 75.0% | 2.4% | 14.8% |
| TENSILE STRENGTH (lbs/sq. inch G) | 543.4 | 950.5 | 784.0 | 724.9 | 718.0 | 766.6 | 629.0 |
| % INCREASE | — | 75.0% | 44.2% | 33.4% | 32.1% | 41.1% | 15.7% |

TABLE 1-continued

|  | TRIAL | | | | | | |
|---|---|---|---|---|---|---|---|
|  | 1 (Control) | 2 | 3 | 4 | 5 | 6 | 7 |
| UNSATURATION (mg/g) | 0.00 | 0.006 | 0.004 | 0.002 | 0.00 | 0.00 | 0.00 |

MA = Maleic Anhydride
SA = Succinic Anhydride
PO = Propylene Oxide

EXAMPLE 2

Similar trials were made using Niax 11-34 polyol (polyol II). The results of these trials are shown in Table 2. Trial 8 was a control (incorporating no adduct); Trials 9-11 and 12-14 utilized maleic anhydride and succinic anhydride, respectively. The ILD and TES properties of the product polyurethane foams showed substantial increases in most cases as compared with the control (trial 8). In trials 9 and 12, the KOH values indicate that the adducts used were half-esters. The ILD and TES values in these trials were best overall at 25% compression, but at 65% compression trial 14 with a KOH value of 0.3 demonstrated roughly equivalent improvement in ILD. The TES values for trials 9 and 12 were among the best, but the TES value in trial 11 with a KOH value of 0.3 was slightly higher than in trial 9. In trials 10 and 13 the free carboxyl groups of the adduct were neutralized using propylene oxide.

TABLE 2

|  | TRIAL | | | | | | |
|---|---|---|---|---|---|---|---|
|  | 8 (Control) | 9 | 10 | 11 | 12 | 13 | 14 |
| REACTANT | None | MA | MA | MA | SA | SA | SA |
| GRAMS REACTANT/ 100 GRAMS POLYOL | None | 3.26 | 3.26 | 1.63 | 3.33 | 3.33 | 1.66 |
| CARBOXYL NEUTRALIZED WITH | — | — | PO | — | — | PO | — |
| VISCOSITY (cps) | 857.0 | 1,040 | 1,040 | 2,400 | 1,900 | 2,280 | 1,900 |
| KOH (mg/g) | 0.0 | 8.0 | 0.1 | 0.3 | 6.4 | 0.6 | 0.3 |
| FOAM DENSITY (g/c$^3$) | 1.8 | 2.1 | 2.0 | 2.0 | 2.1 | 2.1 | 2.1 |
| ILD (lbs/sq. inch) 25% | 20.1 | 36.6 | 33.6 | 26.6 | 34.8 | 30.0 | 33.6 |
| % INCREASE | — | 82.0% | 67.7% | 32.3% | 73.0% | 49.7% | 67.7% |
| 65% | 31.7 | 60.0 | 52.7 | 52.0 | 60.0 | 57.2 | 60.1 |
| % INCREASE | — | 89.0% | 66.2% | 64.0% | 89.0% | 80.4% | 89.6% |
| TENSILE STRENGTH (lbs/sq. inch G) | 885.1 | 920.0 | 909.0 | 925.0 | 966.0 | 906.7 | 893.7 |
| % INCREASE | — | 4.0% | 2.7% | 4.5% | 9.1% | 2.5% | 1.0% |
| UNSATURATION (mg/g) | 0.000 | 0.004 | 0.004 | 0.002 | 0.000 | 0.000 | 0.000 |

MA = Maleic Anhydride
SA = Succinic Anhydride
PO = Propylene Oxide

EXAMPLE 3

Further trials were made following the procedures of Example 1 using Niax 16-56 polyol (polyol III). The results of these trials are shown in Table 3. Trial 15 was a control; trials 16-18 utilized maleic anhydride. The KOH values established that the adduct in trial 16 was a half-ester. The ILD and TES properties of the product polyurethane foam in trial 16 showed good increases, although they were not as significant as with polyols I and II (see Examples 1-2). In trial 17, the free carboxyl groups in the adduct were neutralized using propylene oxide.

TABLE 3

|  | TRIAL | | | |
|---|---|---|---|---|
|  | 15 (Control) | 16 | 17 | 18 |
| REACTANT | None | MA | MA | MA |
| GRAMS REACTANT/100 GRAMS POLYOL | None | 3.27 | 3.27 | 1.63 |
| CARBOXYL NEUTRALIZED WITH | — | — | PO | — |
| VISCOSITY (cps) | 440 | 1,000 | 1,000 | 1,000 |
| KOH (mg/g) | 0.0 | 7.0 | 0.8 | 0.3 |
| FOAM DENSITY (g/c$^3$) | 2.5 | 2.4 | 2.4 | 2.4 |
| ILD (lbs/sq. inch) 25% | 31.4 | 34.6 | 33.0 | 39.3 |
| % INCREASE | — | 10.2% | 5.1% | 25.1% |
| 65% | 77.6 | 79.1 | 78.1 | 83.5 |
| % INCREASE | — | 2.0% | 0.6% | 7.6% |
| TENSILE STRENGTH (lbs/sq. inch G) | 692.6 | 809.4 | 772.5 | 748.6 |
| % INCREASE | — | 16.8% | 11.5% | 8.1% |
| UNSATURATION (mg/g) | 0.000 | 0.007 | 0.005 | 0.004 |

MA = Maleic Anhydride
PO = Propylene Oxide

PREPARATION OF POLYURETHANE FOAMS USING POLYOLTRICARBOXYLIC ACID ADDUCTS

EXAMPLE 4

A half-ester adduct was made using a tricarboxylic acid, and the adduct was used to produce a polyurethane foam. Specifically, a resin reaction vessel continuously flushed with nitrogen gas and equipped with a thermometer, stirrer, reflux condenser and heat exchange means was charged with 1,500 grams polyol II (Niax 11-34), 136 grams of 4-carboxyheptanedioic acid and 0.5 ml of tetra-isopropyl titanate catalyst. The components were kept at 160° C. for about 3 hours to produce a half-ester adduct.

A foam was made from the half-ester adduct, by combining 100 grams of the adduct with one gram of Union Carbide silicone no. 6202, along with 53.7 grams of toluene diisocyanate, 4.5 grams water, 0.125 grams Union Carbide Niax catalyst A-6, and 0.2 grams of stannous octoate, and expanding the mixture into a foam by conventional techniques.

EXAMPLE 5

A polymer-polyol was produced using the adduct from Example 4, and the polymer-polyol was used to produce a polyurethane foam. Specifically, an 85:15 blend of Niax 16-56/Niax 11-27 polyols, and an 80:20 blend of styrene/acrylonitrile monomers were prepared. An aliquot of 2.5 grams of the adduct produced in Example 4 was combined with 67.5 grams of the polyol blend. Over a period of three hours, a mixture of 30 grams of the monomer blend and 0.6 grams azo-bis-butyronitrile catalyst was fed into the mixture of adduct and polyol blend. The resulting mixture was kept at about 130°-140° C. and stirred continuously. After feeding of the monomer blend with the catalyst was completed, the mixture was then stirred at a temperature of about 140°-150° C. for an additional hour. The resulting polymer-polyol product had an acceptable viscosity and particle size. A foam was produced from the polymer-polyol according to the techniques used in Example 4.

EXAMPLE 6

An adduct was produced by reaction of a polyol with (the product of reaction of a tricarboxylic acid with a low molecular weight polyhydroxyhydrocarbon), and the adduct was used to produce a polyurethane foam.

To produce the adduct, ethylene glycol was reacted with 4-carboxyheptanedioic acid. Specifically, 62.02 grams (1 mole) of ethylene glycol was esterified with 204 grams (1 mole) of 4-carboxyheptanedioic acid under agitation at about 95° C. for about 24 hours. A liquid hydroxycarboxylic acid product was formed. An aliquot of 10.5 grams of the hydroxycarboxylic acid was added to 500 grams of Union Carbide Niax 11-27 polyol and the polyol was esterified at about 180° C. for about 10 hours. The carboxyl groups of the hydroxycarboxylic acid reacted with the polyol, reducing the KOH value to below 1. An aliquot of the adduct was then used to produce a polyurethane foam by the technique in Example 4.

EXAMPLE 7

A polymer-polyol was produced using the adduct from Example 6, and the polymer-polyol was used to produce a polyurethane foam. More specifically, an 85:15 blend of Niax 16-56/Niax 11-27 polyols, and an 80:20 blend of styrene/acrylonitrile monomers were prepared. An aliquot of 2.5 grams of the adduct produced in Example 6 was combined with 67.5 grams of the polyol blend. Over a period of 3 hours, a mixture of 30 grams of the monomer blend and 0.6 grams azo-bis-butyronitrile catalyst was fed into the mixture of adduct and polyol blend. The resulting mixture was kept at about 130°-140° C. and stirred continuously. After feeding of the monomer blend with catalyst was completed, the mixture was then stirred at a temperature of about 140°-150° C. for an additional hour. The resulting polymer-polyol product had an acceptable viscosity and particle size. A foam was produced from the polymer-polyol according to the techniques used in Example 4.

SUPERIORITY OF ADDUCTS HAVING SUBSTANTIAL FREE CARBOXYL CONTENT

EXAMPLE 8

Trials were conducted to demonstrate the superiority of adducts having a substantial free carboxyl content (i.e., half esters), as compared with adducts having negligible free carboxyl content. The results of these trials are shown in Table 4. Procedures similar to those used in Example 1 were followed to produce the adducts and polyurethane foams. The results in terms of both ILD and TES of product foams point to the superiority of a KOH value (acid equivalent) in half esters from dicarboxylic anhydrides of about 10 (see trial 22).

TABLE 4

| | TRIAL | | | |
|---|---|---|---|---|
| | 19 (Control) | 20 | 21 | 22 |
| REACTANT | None | MA | MA | MA |
| GRAMS REACTANT/ 100 GRAMS POLYOL | None | 3.26 | 3.26 | 3.26 |
| CARBOXYL NEUTRALIZED WITH | — | — | — | — |
| VISCOSITY (CPS) | 1,214 | 2,280 | 3,300 | 5,800 |
| KOH (mg/g) | 0.0 | 16.5 | 12.2 | 10.0 |
| FOAM DENSITY (g/c³) | 2.0 | 2.5 | 2.5 | 2.4 |
| ILD (lbs/sq. inch) 25% | 20.0 | 21.8 | 39.4 | 41.6 |
| % INCREASE | — | 9.0% | 97.0% | 108.0% |
| 65% | 41.0 | 41.7 | 58.5 | 90.0 |
| % INCREASE | — | 1.7% | 42.6% | 119.5% |
| TENSILE STRENGTH (lbs/sq. inch G) | 543.4 | 564.0 | 905.0 | 963.0 |
| % INCREASE | — | 3.8% | 66.6% | 77.2% |
| UNSATURATION (mg/g) | 0.000 | 0.090 | 0.030 | 0.000 |

MA = Maleic Anhydride

EXAMPLE 9

Further trials were conducted to demonstrate the superiority of adducts having free carboxyl groups (half-esters) as compared with adducts in which the carboxyl functionalities have been neutralized. The results of these trials are shown in Table 5. Trial 23 was a control. Trial 24 was a comparative control demonstrating the superiority of half-esters: maleic anhydride and polyol I were combined in a weight ratio of 3.26:100, the carboxyl functionalities on the adduct were not neutralized, and the adduct was combined with a polyisocyanate to produce a polyurethane foam. In trials 25, 26 and 27, respectively, the carboxyl functionalities of an identical amount of the same adduct as produced in trial 24 were neutralized with N-ethyl morpholine, morpholine and diethanol amine. While the foam densities in all four trials 24–27 were roughly equivalent, the half-ester produced in trial 24 demonstrated superior ILD both at 25% and 65% compression relative to the other trials. Its TES of 863.1 approximated the highest value obtained in the other three trials, that is, 870.1 in trial 25.

EXAMPLE 11

A series of trials were conducted using procedures similar to that used in Example 10. The results of these trials are shown in Table 6. The proportions of polyol and specially produced hydroxycarboxylic acid are expressed in relative proportions by weight in grams. Trial 28 is a control employing a polyol without modification. In trial 29 a hydroxycarboxylic acid was formed by the reaction of ethylene glycol and succinic anhydride, which was then reacted with the polyol. In trial 30, a hydroxycarboxylic acid was formed as the reaction product of ethylene glycol and maleic anhydride, and the hydroxycarboxylic acid was then reacted with the polyol. In trial 31, a hydrocarboxylic acid was produced as the reaction product of ethylene glycol and itaconic acid, and the hydroxycarboxylic acid was re-

TABLE 5

| | TRIAL | | | | |
|---|---|---|---|---|---|
| | 23 (Control) | 24 | 25 | 26 | 27 |
| REACTANT | None | MA | MA | MA | MA |
| GRAMS REACTANT/ 100 GRAMS POLYOL | None | 3.26 | 3.26 | 3.26 | 3.26 |
| CARBOXYL NEUTRALIZED WITH | — | — | N—ethyl morpholine | morpholine | diethanolamine |
| VISCOSITY (CPS) | 1,214 | 20,500 | 20,500 | 20,500 | 20,500 |
| KOH (mg/g) | 0.0 | 7.7 | 0.0 | 0.0 | 0.0 |
| FOAM DENSITY (g/c$^3$) | 2.0 | 2.3 | 1.9 | 2.2 | 2.0 |
| ILD (lbs/sq. inch) 25% | 20.0 | 37.0 | 34.4 | 31.4 | 25.8 |
| % INCREASE | — | 85.0% | 72.0% | 57.0% | 29.0% |
| 65% | 41.0 | 76.4 | 63.5 | 66.3 | 62.1 |
| % INCREASE | — | 86.4% | 55.0% | 61.7% | 51.4% |
| TENSILE STRENGTH (lbs/sq. inch G) | 543.4 | 863.1 | 870.1 | 825.0 | 683.0 |
| % INCREASE | — | 59.0% | 60.1% | 52.0% | 25.7% |
| UNSATURATION (mg/g) | 0.00 | 0.01 | 0.01 | 0.01 | 0.01 |

MA = maleic anhydride

PREPARATION OF POLYURETHANE FOAMS USING ADDUCTS PRODUCED FROM HYDROXYCARBOXYLIC INTERMEDIATES

EXAMPLE 10

A half ester adduct was produced by reaction of a polyol with (the product of reaction of a polycarboxylic anhydride with a low molecular weight polyhydroxyhydrocarbon).

To produce the adduct, ethylene glycol was first reacted with maleic anhydride. Specifically, 62.02 grams (1 mole) of ethylene glycol was esterified with 98 grams (1 mole) of maleic anhydride under agitation at 95° C. for 24 hours. Reaction conditions prevented the second carboxyl carbon of the maleic anhydride molecules from reacting, and a liquid hydroxycarboxylic acid product was formed. The KOH equivalent (free carboxyl groups) of the product was approximately 240 milligrams KOH per gram. An aliquot of 18.7 grams of the hydroxycarboxylic acid produced above was added to 500 grams of Union Carbide Niax 11–27 polyol and the polyol was esterified at 180° C. until the KOH value was reduced to 0.5. The carboxyl groups of the hydroxycarboxylic acid reacted with the polyol and the viscosity of the adduct increased to 10,000 cps. Thus the carboxyl groups in the hydroxycarboxylic acid were reacted with the polyol without reducing the hydroxy functionality of the polyol.

acted wih the polyol. The adducts were then reacted with polyisocyanates, and conventional expanding techniques were employed to produce polyurethane foams. The properties of the product foams were then tested. The maleic anhydride-ethylene glycol hydroxycarboxylic acid adduct of trial 30 produced a better foam than the itaconic acid-ethylenw glycol hydroxycarboxylic acid adduct of trial 31, and the itaconic acid adduct of trial 31 produced a better foam than the succinic anhydride-ethylene glycol hydroxycarboxylic acid adduct of trial 29. All three of the trials 29–31 produced better results than the unmodified polyol of trial 28.

TABLE 6

| TRIAL | 28 (Control) | 29 | 30 | 31 |
|---|---|---|---|---|
| REACTANT | None | A | B | C |
| GRAMS REACTANT/ 100 GRAMS POLYOL | None | 2.12 | 2.3 | 4.60 |
| VISCOSITY (CPS) | 1,219 | 9,000 | 10,000 | 4,100 |
| KOH (mg/g) | 0.0 | 1.3 | 0.80 | 1.1 |
| FOAM DENSITY (g/c$^3$) | 2.0 | 2.0 | 2.0 | 2.0 |
| ILD (lbs/sq. inch) 25% | 20.0 | 20.6 | 33.1 | 29.0 |
| % INCREASE | — | 3.0% | 65.5% | 45.0% |
| 65% | 41.0 | 51.0 | 60.0 | 46.3 |
| % INCREASE | — | 24.4% | 46.3% | 12.9% |
| TENSILE STRENGTH (lbs/sq. inch G) | 543.4 | 544.6 | 871.5 | 700 |
| % INCREASE | — | 0.2% | 60.4% | 28.8% |

TABLE 6-continued

| TRIAL | 28 (Control) | 29 | 30 | 31 |
|---|---|---|---|---|
| UNSATURATION (mg/g) | 0.00 | 0.00 | 0.00 | 0.00 |

A = Reaction product of ethylene glycol and succinic anhydride
B = Reaction product of ethylene glycol and maleic anhydride
C = Reaction product of ethylene glycol and itaconic acid

PRODUCTION OF POLYURETHANE FOAMS USING EPOXY ADDUCTS

EXAMPLE 12

Trials were conducted to demonstrate the utility of adducts produced as reaction products of a polyol and a diepoxide for the preparation of polyurethane products including polyurethane foams. The results of these trials are shown in Table 7. Trials 32 and 33 were controls, in which no modification of the polyol was carried out. (Trial 32 is the control for trials 34–36 and 38 employing polyol I; trial 33 is the control for trials 37 and 39 employing a polyol I-III (15/85 weight ratio) blend. Trials 34 and 35 employed mono-epoxides; trials 36 to 39 employed diepoxides. A representative preparation using a diepoxide proceeded as follows. A reaction vessel continuously flushed with nitrogen and equipped with a thermometer, reflux condenser, stirrer and heat exchange means was charged with 250 grams of Niax polyol 11-27 (polyol I), 5.7 grams of Union Carbide diepoxide ERL-4221 (3,4-epoxycyclohexyl-methyl-3,4-epoxycyclohexane carboxylate) and 0.125 milliliters of boron trifluoride catalyst. The mixture was heated to about 70° C. and allowed to react for about 10 hours until the epoxide content of the mixture was found to be about one-half of the initial amount, indicating that one of the epoxide radicals on the diepoxide molecules had reacted with a hydroxyl group from the polyol. The epoxy content of the initial reaction solution was 0.16 milligrams per gram, and the final epoxide content was about 0.062 milligrams per gram of product. The viscosity of the final product was 7,800 cps. The trials involving use of monoepoxides were run in subsantially the same manner, except that at the end of the reactions, e.g., about 10 hours, the free epoxide content in the reaction mixture had been reduced substantially to zero. In summary, the epoxy reactants in trials 34, 35, 36, 37, 38 and 39 respectively, were: allyl glycidyl ether; phenyl glycidyl ether; Union Carbide ERL 4221 (3,4-epoxy cyclohexylmethyl-3,4-epoxy cyclohexylhexane carboxylate); ERL-4221; ERL-4234 (2-(3,4-epoxy cyclohexyl-5,5-spiro-3,4-epoxy)-cyclohexane-meta-dioxane); and ERL-4234. The free epoxy content of the reaction mixtures was tested using the pyridinium hydrochloride test method. Trials 34–39 generally showed improvements in ILD and TES as compared to the controls. Comparison of the results in trials 34 and 35 showed that allyl glycidyl ether which is unsaturated, gave a better foam product than phenyl glycidyl ether, which is aromatic but contains no ethylenic unsaturation. Apparently in the case of ethylenically-unsaturated epoxides the unsaturated groups constitute reactive sites in addition to the epoxy group. Allyl glycidyl ether thus reacts in a somewhat analogous manner to diepoxides. In trials 37 and 39, styrene and acrylonitrile in an 80:20 weight ratio were added in an amount of 30% to the reaction mixtures, based on total weight of the reaction mixtures, so that polymer-polyols were produced. The adducts and polymer-polyols were combined with polyisocyanates and expanded into polyurethane foam according to conventional techniques.

TABLE 7

| TRIAL | 32 | 33 | 34 | 35 | 36 | 37 | 38 | 39 |
|---|---|---|---|---|---|---|---|---|
| POLYOL | I (Control) | III/I (Control) | I | I | I | III/I | I | III/I |
| REACTANT | None | None | A.G.E. | P.G.E. | ERL-4221 | ERL-4221 | ERL-4234 | ERL-4234 |
| GRAMS REACTANT/ 100 GRAMS POLYOL | None | None | 3.8 | 5.0 | 2.27 | 0.37 | 2.39 | 0.38 |
| VISCOSITY (cps) | 1,219 | 1,900 | 1,300 | 1,800 | 7,800 | 1,840 | 1,400 | 1,350 |
| EPOXY EQUIVALENT (Pyridinium hydrochloride Method grams/gram mole | 0.0 | 0.0 | 0.03 | 0.05 | 0.06 | 0.00 | 0.05 | 0.00 |
| MONOMER USED % (Styrene/Acrylonitrile) | — | — | — | — | — | 30% | — | 30% |
| STYRENE/ACRYLONITRILE RATIO | — | — | — | — | — | 80/20 | — | 80/20 |
| FOAM DENSITY (g/c³) | 2.0 | 2.2 | 2.5 | 2.2 | 1.9 | 1.6 | 1.88 | 1.93 |
| ILD (lbs/sq. inch) 25% | 20.0 | 26.2 | 30.3 | 23.5 | 45.1 | 50.5 | 22.7 | 37.3 |
| % INCREASE | — | — | 51.5% | 17.5% | 125.5% | 93.0% | 13.5% | 42.4% |
| 65% | 41.0 | 90.1 | 58.7 | 50.7 | 100.0 | 91.0 | 78.3 | 96.2 |
| % INCREASE | — | — | 43.2% | 23.6% | 143.9% | 1.0% | 91.0% | 6.7% |
| TENSILE STRENGTH (lbs/sq. inch G) | 543.4 | 700.0 | 806.1 | 628.9 | 643.7 | 742.6 | 494.3 | 601.6 |
| % INCREASE | — | — | 48.3% | 15.7% | 18.4% | 6.0% | −9.0% | −14.1% |

A.G.E. = Allyl Glycidyl Ether
P.G.E. = Phenyl Glycidyl Ether

EXAMPLE 13

An adduct was produced by reaction of a polyol with (the product of reaction of a polyepoxide with a polybasic carboxylic acid), and the adduct was used to produce a polyurethane foam.

To produce the adduct, maleic acid was first reacted with limonene dioxide. Specifically, a 500 ml flat bottom flask continuously flushed with nitrogen gas and equipped with a reflux condenser, thermometer and a stirrer was charged first with 58 grams of maleic acid and then with 84 grams of limonene dioxide. The initial KOH value of the maleic acid, and epoxy equivalent of the limonene dioxide were, respectively, 395.0 mg/g and 1.76 g/g-mole. The limonene dioxide was continuously fed into the flask over a period of about seventeen minutes. An exothermal reaction took place, lasting until about fifteen minutes after all of the limonene dioxide was added to the flask. Due to the reaction conditions, and particularly because the highest reaction temperature was only about 130° C., the product was a "half-ester," in which maleic acid and limonene dioxide reacted leaving an acid group and an epoxy group unreacted. The KOH and epoxy equivalent values of the half-esters were 240.3 mg/g and 0.67 g/g-mole, respectively.

Next, a resin reaction vessel continuously flushed with nitrogen and equipped with thermometer, stirrer, reflux condenser and heat exchange means was charged with 500 grams polyol I (Niax 11-27), 18.8 grams of the half-ester and 0.25 ml of tetra-isopropyl-titanate catalyst. The polyol was esterified by heating the vessel contents to about 180° C. for about 10 hours. The viscosity of the product was about 3,500 cps. The KOH and epoxy equivalents of the product were reduced, respectively, to about 2.1 mg/g and 0.007 mg/g-mole.

A foam was made from the adduct by combining 100 grams of the adduct with 1.0 grams Union Carbide silicon no. 6202, along with 52.4 grams of toluene diisocyanate, 4.5 grams water, 0.125 grams Union Carbide Niax catalyst A-6, and 0.2 grams stannous octoate, and expanding the mixture into a foam by conventional techniques.

The product foam had a density of 1.9 g/cm$^3$, and ILD values at 25% and 65% compression of 25.7 and 45.3, respectively.

EXAMPLE 14

A polymer-polyol was produced using the adduct from Example 13, and the polymer-polyol was used to produce a polyurethane foam. An 85:15 blend of Niax 16-56/Niax 11-27 polyols was prepared by mixing together 230.4 grams Niax 16-56 and 40.6 grams Niax 11-27. A 70:30 blend of styrene/acrylonitrile was prepared by mixing together 88.4 grams styrene and 37.9 grams acrylonitrile. An aliquot of 21.1 grams of the adduct produced in Example 13 was combined with the polyol blend. The styrene/acrylonitrile and 2.6 grams of azobisbutyronitrile catalyst were mixed together and then fed into the mixture of adduct and polyol blend at a rate of about 1.41 ml/minute. The resulting mixture was kept at about 130° C. and stirred continuously. After feeding of the monomer blend with catalyst was completed, the mixture was then stirred for an additional hour at the same temperature. The resulting polymer-polyol product had a maximum particle size bordering on invisibility under microscopic examination (less than about 1 micron diameter), and a viscosity of about 2,000 cps.

A foam was made from the polymer-polyol by containing 100 grams of the polymer-polyol with 1.0 grams Union Carbide silicone no. 6202, along with 53.7 grams toluene diisocyanate, 4.5 grams water, 0.125 grams Union Carbide Niax catalyst A-6, and 0.2 grams stannous octoate, and expanding the mixture into a foam by conventional techniques.

The product foam had a density of 2.0 g/cm$^3$, and ILD values at 25% and 65% compression of 39.3 and 97.2, respectively.

POLYMER-POLYOL PREPARATION AND USE IN PRODUCING POLYURETHANE FOAMS

EXAMPLE 15

Trials were conducted to demonstrate the value of polymer-polyols incorporating adducts of the invention. The results of these trials are shown in Tables 8a and 8b, which respectively summarize trials 40-44 and 45-49. In an exemplary preparation, 1,500 grams of Niax polyol 11-27 (polyol I), together with 49 grams maleic anhydride and 0.75 milliliter of tetra isopropyl titanate catalyst were combined and heated to 120° C. for 45 minutes to dissolve the maleic anhydride. The reaction mixture was then heated to 170° C. for about 3 hours, yielding a half-ester reaction product. In order to produce a polymer-polyol, an 85:15 blend of Niax 16-56/Niax 11-27 polyols, and an 80:20 blend of styrene/acrylonitrile monomers were prpared. An aliquot of 2.5 grams of the adduct produced above was combined with 67.5 grams of the polyol blend. Over a period of three hours, a mixture of 30 grams of the monomer blend and 0.6 grams azo-bis-butyronirile catalyst was fed into the mixture of adduct and polyol blend. The resulting mixture was kept at about 130°-140° C. and stirred continuously. After feeding of the monomer blend with the catalyst was completed, the mixture was then stirred at a temperature of about 140°-150° C. for an additional hour. The resulting polymer-polyol product had a viscosity of about 9,000 cps and small particle size with some large particles. A foam was produced from the polymer-polyol using conventional techniques.

Additional trials were run in a similar manner, and the results are shown in Table 8. (The above discussion relates to trial 44). Trial 40 was a control employing no adducts. Trials 41-43, 44-46, and 47-49 employed 10%, 5% and 2.5% of adducts, respectively, based on the weight of the polyol used to dilute the adduct. Trials 41, 44, and 47 employed (Polyol 11-27)-(maleic anhydride) adducts. Trials 42, 45 and 48 employed (polyol 11-27)-(maleic anhydride-ethylene glycol) adducts. Trials 43, 46, and 49 employed (polyol 11-27)-(maleic anhydride-1.3-butylene glycol) adducts. The latter group (trials 43, 46 and 49) yielded the highest ILD percent increase values. The (polyol 11-27)-(maleic anhydride-ethylene glycol) adduct trials (trials 42, 45, and 48) yielded the best improvements in TES.

TABLE 8A

| TRIAL | 40 (Control) | 41 | 42 | 43 | 44 |
|---|---|---|---|---|---|
| POLYOL BLEND USED | 16-56/11-27 | 16-56/11-27 | 16-56/11-27 | 16-56/11-27 | 16-56/11-27 |
| POLYOL BLEND RATIO (by Weight) | 85/15 | 85/15 | 85/15 | 85/15 | 85/15 |
| ADDUCT (Polyol/Reactant) | — | 11-27/MA | 11-27/EG-MA | 11-27/1.3-BG-MA | 11-27/MA |
| GRAMS REACTANT/ 100 GRAMS POLYOL | — | 0.53 | 0.37 | 0.46 | 0.26 |
| % ADDUCT USED | — | 10% | 10% | 10% | 5% |
| STYRENE/ACRYLONITRILE RATIO (By Weight) | 80/20 | 80/20 | 80/20 | 80/20 | 80/20 |
| % MONOMER USED | 30% | 30% | 30% | 30% | 30% |

TABLE 8A-continued

| TRIAL | 40 (Control) | 41 | 42 | 43 | 44 |
|---|---|---|---|---|---|
| POLYMER-POLYOL PROPERTIES: | | | | | |
| BROOKFIELD VISCOSITY (cps) | 1,900 | 3,440 | 4,900 | 5,000 | 9,000 |
| PARTICLE SIZE | Medium Some Large | Borderline of Visibility | Borderline of Visibility | Borderline of Visibility | Small, Some Large |
| FOAM DENSITY (g/c$^3$) | 2.2 | 2.0 | 1.8 | 1.7 | 1.9 |
| ILD (lbs/sq. inch) | 26.2 | 41.3 | 44.0 | 49.3 | 40.1 |
| 25% | | | | | |
| % INCREASE | — | 57.6% | 67.9% | 88.2% | 53.0% |
| 65% | 90.1 | 115.6 | 92.3 | 138.0 | 110.2 |
| % INCREASE | — | 28.3% | 2.4% | 53.2% | 22.3% |
| TENSILE STRENGTH (lbs/sq. inch G) | 700.0 | 706.0 | 843.0 | 768.0 | 782.0 |
| % INCREASE | — | .9% | 20.4% | 9.7% | 11.7% |

EG = Ethylene Glycol
MA = Maleic Anhydride
1,3-BG = 1,3-Butylene Glycol

TABLE 8B

| TRIAL | 45 | 46 | 47 | 48 | 49 |
|---|---|---|---|---|---|
| POLYOL BLEND USED | 16-56/11-27 | 16-56/11-27 | 16-56/11-27 | 16-56/11-27 | 16-56/11-27 |
| POLYOL BLEND RATIO (By Weight) | 85/15 | 85/15 | 85/15 | 85/15 | 85/15 |
| ADDUCT (Polyol/Reactant) | 11-27/EG-MA | 11-27/1,3-BG-MA | 11-27/MA | 11-27/EG-MA | 11-27/1,3-BG-MA |
| GRAMS REACTANT/ 100 GRAMS POLYOL | 0.185 | 0.23 | 0.13 | 0.092 | 0.115 |
| % ADDUCT USED | 5% | 5% | 2.5% | 2.5% | 2.5% |
| STYRENE/ACRYLONITRILE RATIO (By Weight) | 80/20 | 80/20 | 80/20 | 80/20 | 80/20 |
| % MONOMER USED | 30% | 30% | 30% | 30% | 30% |
| POLYMER-POLYOL PROPERTIES: | | | | | |
| BROOKFIELD VISCOSITY (cps) | 2,520 | 2,760 | 17,000 | 2,800 | 2,900 |
| PARTICLE SIZE | Borderline of Visibility | Borderline of Visibility | Medium Some Large | Borderline of Visibility | Borderline of Visibility |
| FOAM DENSITY (g/c$^3$) | 1.82 | 1.8 | 1.7 | 1.7 | 1.82 |
| ILD (lbs/sq. inch) | 45.1 | 48.3 | 36.3 | 44.6 | 49.1 |
| 25% | | | | | |
| % INCREASE | 72.1% | 84.4% | 38.5% | 70.2% | 87.4% |
| 65% | 98.2 | 125.0 | 101.0 | 103.2 | 122.0 |
| % INCREASE | 9.0% | 38.7% | 12.1% | 14.5% | 35.4% |
| TENSILE STRENGTH (lbs/sq. inch G) | 870.0 | 743.0 | 682.0 | 743.0 | 701.6 |
| % INCREASE | 24.3% | 6.1% | −2.6% | 6.1% | .2% |

EG = Ethylene Glycol
MA = Maleic Anhydride
1,3-BG = 1,3-Butylene Glycol

EXAMPLE 16

Trials were conducted to illustrate production of polyurethane foam from polymer-polyols employing 100% polystyrene and no acrylonitrile as the ethylenically unsaturated monomers. The results of these trials are shown in Table 9. Stable polystyrene dispersions are very difficult to make in polymer-polyols, but acceptable products may be produced using the adducts of the invention as demonstrated by these trials. In trials 50-53 the base polyol used consisted of a blend of 85% Niax 16-56 with 15% Niax 11-27 by weight. In trial 54, no Niax 16-56 was used and the base polyol was 100% Niax 11-27. Trial 50 was a control in which no adduct was used. In trial 51, a half-ester adduct produced by reacting Niax 11-34 with maleic acid was used; in trial 52, a half-ester adduct produced by reacting Niax 11-34 with maleic anhydride was used; in trial 53, a half-ester adduct was produced by reacting Niax 11-27 with maleic acid; and in trial 54, a half-ester adduct was produced by reacting Niax 11-27 with maleic acid. The percentages of the above adducts used in the trials ranged from 2.15% up to 10%. In the control trial, no ethylenically-unsaturated monomers were used; in the other trials, the ethylenically unsaturated monomer was 100% styrene. The maximum particle size in the polymer-polyol dispersions produced in trials 51-54 was in an acceptable size range of 1-5 microns. In trials 50 and 52 the initial products (in trial 50 the product is a simple polyol, and in trial 52 the product is a polymer-polyol), were used to produce polyurethane foams by reaction with polyisocyanates. The ILD percent increases in trial 52 at both 25% and 65% compression demonstrated that the foam in trial 52 was superior to that in control trial 50. These trials showed that polymer-polyols incorporating 100% polystyrene with no acrylonitrile may be produced according to the present invention with adducts, and additionally show that polyurethanes superior to those produced using simple polyols may be produced with these polymer-polyols.

TABLE 9

| TRIAL | 50 | 51 | 52 | 53 | 54 |
|---|---|---|---|---|---|
| POLYOL OR POLYOL BLEND USED | 16-56/11-27 | 16-56/11-27 | 16-56/11-27 | 16-56/11-27 | 11-27 |
| POLYOL BLEND RATIO | 85/15 | 85/15 | 85/15 | 85/15 | — |

TABLE 9-continued

| TRIAL | 50 | 51 | 52 | 53 | 54 |
|---|---|---|---|---|---|
| ADDUCT USED | — | (11-34) + MAC | (11-34) + MA | (11-27) + MAC | (11-27) + MAC |
| % ADDUCT USED | 0 | 3.2% | 3.2% | 10% | 2.15% |
| KOH (mg/g) | — | 8.4 | 8.2 | 6.5 | 6.0 |
| STYRENE | No | Yes | Yes | Yes | Yes |
| Viscosity (cps) | — | 1,580 | 2,200 | 2,000 | 1,360 |
| Particle Size Microns | — | 4-5 | 2-3 | 1-2 | 4-5 |
| FOAM DENSITY (g/cm$^3$) | 2.27 | | 2.3 | | |
| ILD (lb/sq. inch) 25% | 31.0 | | 32.9 | | |
| % INCREASE | — | | 6.1% | | |
| 65% | 94.0 | | 98.4 | | |
| % INCREASE | — | | 4.7% | | |

MA = Maleic Anhydride
MAC = Maleic Acid

EXAMPLE 17

An additional series of trials was made to demonstrate the superior polyurethane foams that may be produced using the adduct-containing polymer-polyols of the present invention. The results of these trials are shown in Table 10. In all of these trials, a blend of 85% acrylonitrile was used in trial 55. In all of the trials 56-62, improvements were demonstrated in ILD and TES, as compared with control trial 55 which employed no polymer-polyol and no adduct. As compared with control trial 56, in which a polymer-polyol was used but without any adduct, the majority of the other trials 57-62 showed improvements in ILD and TES.

TABLE 10

| TRIAL | 55 | 56 (Control) | 57 | 58 | 59 | 60 | 61 | 62 |
|---|---|---|---|---|---|---|---|---|
| POLYOL BLEND | III/I | III/I | III/I | III/I | III/I | III/I | III/I | III/I |
| BLEND % | 85/15 | 85/15 | 85/15 | 85/15 | 85/15 | 85/15 | 85/15 | 85/15 |
| ADDUCT USED (Polyol/Reactant) | None | None | (11-27)/MA | (11-27)/EG-MA | (11-27)EG-SA | (11-27)/EG-MA | (11-27)/EG-MA | (11-27)/EG-MA |
| % ADDUCT USED | None | None | 10.0% | 10.0% | 10.0% | 10.0% | 10.0% | 10.0% |
| STYRENE/ACRYLONITRILE RATIO | None | 80/20 | 80/20 | 80/20 | 80/20 | 80/20 | 100/0 | 80/20 |
| POLYMER % | 0.0 | 30% | 30% | 30% | 30% | 30% | 30% | 20% |
| VISCOSITY (cps) | 590.0 | 1,900 | 2,600 | 5,500 | 2,300 | 5,500 | 5,500 | 3,670 |
| FOAM DENSITY (g/c$^3$) | 1.8 | 2.2 | 2.0 | 2.3 | 2.0 | 1.7 | 2.1 | 2.0 |
| ILD (lbs/sq. inch) 25% | 21.7 | 26.2 | 40.13 | 126.7 | 40.1 | 43.7 | 28.1 | 36.0 |
| % INCREASE | — | — | 53.2% | 383.6% | 53.0% | 66.8% | 7.2% | 37.4% |
| 65% | 33.3 | 90.1 | 96.0 | 227.5 | 100.0 | 49.1 | 69.7 | 60 |
| % INCREASE | — | — | 6.5% | 152.5% | 11.0% | -45.5% | -22.6% | -33.4% |
| TENSILE STRENGTH (lbs/sq. inch G) | 584.7 | 700.0 | 900.0 | 998.7 | 942.0 | 950.3 | 762.6 | 950.3 |
| % INCREASE | — | — | 28.6% | 42.7% | 34.6% | 35.7% | 8.9% | 35.7% |

SA = Succinic Anhydride
MA = Maleic Anhydride
EG = Ethylene Glycol polyol III with 15% polyol I by weight was used. In trials 55 and 56 no adduct was used. Trials 55, 56 and 57 are controls. Trial 55 is a control using only unmodified polyol. Trial 56 is a control using unmodified polyol to produce a polymer-polyol. Trial 57 is a control showing comparative results for a half-ester. The ILD and TES percent increases in trials 58-62 were calculated using trial 56 as the control. In trials 57, 58, 59, 60, 61 and 62 the adducts used, respectively were: a half-ester adduct of polyol 11-27 with maleic anhydride; (ethylene glycol reacted with maleic anhydride) further reacted with polyol 11-27; (ethylene glycol reacted with succinic anhydride) further reacted with polyol 11-27; (ethylene glycol reacted with maleic anhydride) further reacted with polyol 11-27; (ethylene glycol reacted with maleic anhydride) further reacted with polyol 11-27; and (ethylene glycol reacted with maleic anhydride) further reacted with polyol 11-27. In all of these trials, 10 grams of the adduct was used per 100 grams of polymer-polyol. Various styrene-acrylonitrile ratios were used in trials 56-62 as shown in the Table; no styrene or

EXAMPLE 18

An additional series of trials was made to demonstrate the superior polyurethane foams that may be produced using the polymer-polyols of the present invention. The results of these trials are shown in Table 11. In trials 63-65 no adduct was used. In trials 66-71, the adducts used were, respectively, (1) a half-ester adduct formed by the reaction of polyol 11-27 with maleic anhydride; (2) an adduct formed by reaction of polyol 11-27 with an intermediate, the intermediate formed by 1:1 molar equivalent reaction between maleic anhydride and ethyl alcohol; (3) an adduct formed by reaction of polyol 11-27 with an intermediate, the intermediate being formed by 1:1 molar equivalent reaction between maleic anhydride and ethylene glycol; (4) an adduct formed by reaction of polyol 11-27 with an intermediate, the intermediate being formed by 1:1 molar equivalent reaction between maleic anhydride and 1,3-butylene glycol; (5) an adduct formed by reaction of polyol 11–27 and an intermediate, the intermediate being formed by 1:1 molar equivalent reaction between maleic anhydride and propylene glycol; and (6) a half-ester adduct formed by reaction of polyol 11–27 with maleic anhydride. Compared with trial 65, trials 66–71 generally showed increases in ILD at both 25% and 65% compression. Results in trials 68 and 69 in which the ethylene glycol-maleic anhydride and 1,3-butylene glycol-maleic anhydride adducts were used, respectively, gave particularly good improvements in ILD. Tensile strength (TES) values for trials 68–71 also generally showed improvement over the control.

TABLE 12-continued

| TRIAL | 72 | 73 | 74 |
|---|---|---|---|
| BLEND RATIO | — | — | 85/15 |
| POLYOL USED (grams) | 500 | 400 | 400 |
| MONOMER USED (grams) | 150 | 100 | 100 |
| MONOMER BLEND RATIO (Styrene/Acrylonitrile) | 100/0 | 100/0 | 100/0 |
| % MONOMER USED | 22.0 | 20.0 | 20.0 |
| CATALYST CONTENT (grams) | 5.6 | 2.0 | 2.0 |
| TOTAL POLYMER IN PRODUCT | — | — | — |
| VISCOSITY | Coagulated | Coagulated | Coagulated |
| PARTICLE SIZE | — | — | — |

TABLE 11

| TRIAL | 63 | 64 | 65 (Control) | 66 | 67 | 68 | 69 | 70 | 71 |
|---|---|---|---|---|---|---|---|---|---|
| POLYOL | I | III | III/I (85/15 Weight Ratio) | — | — | — | — | — | — |
| ADDUCT | — | — | — | I/MA | I/(MA-ETOH) | I/(MA-EG) | I/(MA-BG) | I/(MA-PG) | I/MA |
| % ADDUCT | None | None | None | 10% | 10% | 10% | 10% | 10% | 100% |
| STYRENE/ACRYLONITRILE RATIO | 50/50 | 25/75 | 80/20 | 80/20 | 80/20 | 80/20 | 80/20 | 80/20 | — |
| POLYMER CONTENT | 21% | 32% | 30% | 30% | 30% | 30% | 30% | 30% | None |
| VISCOSITY (CPS) | 1,960 | 3,450 | 1,900 | 2,600 | 3,300 | 5,800 | 5,200 | 70,000 | 2,240 |
| DENSITY (g/c$^3$) | 2.0 | 1.6 | 2.2 | 2.0 | 1.5 | 2.1 | 1.65 | 1.9 | 2.0 |
| ILD (lbs/sq. inch) 25% | 29.3 | 55.0 | 26.2 | 40.13 | 27.0 | 59.6 | 53.8 | 42.0 | 32.8 |
| % INCREASE | — | — | — | 53% | 3.0% | 127.5% | 105.3% | 60.0% | 25.2% |
| 65% | 47.0 | 152.7 | 90.1 | 96.0 | 91.5 | 120.9 | 165 | 92.6 | 64.5 |
| % INCREASE | — | — | — | 6.5% | 1.5% | 34.2% | 83.1% | 2.8% | −28.5% |
| TENSILE STRENGTH (lbs/sq. inch G) | 795.6 | 987.0 | 700.0 | 900.0 | 583.4 | 840.0 | 742.3 | 750.0 | 770.6 |
| % INCREASE | — | — | — | 28.5% | −16.6% | 20.0% | 6.0% | 7.1% | 10.0% |

MA = Maleic Anhydride
BG = 1,3 Butylene Glycol
ETOH = Ethyl Alcohol
PG = Propylene Glycol
EG = Ethylene Glycol

EXAMPLE 19

A series of trials was carried out to show the inferior results obtained when polymer-polyols employing 100% styrene as ethylenically-unsaturated monomer (no acrylonitrile) are produced in the absence of adducts of the invention. The results are summarized in Table 12. The resultant polymer-polyols were coagulated and could not be used to produce acceptable polyurethane foam.

TABLE 12

| TRIAL | 72 | 73 | 74 |
|---|---|---|---|
| POLYOL OR POLYOL BLEND | I | I | III/I |

EXAMPLE 20

A series of trials was carried out to show the inferior results obtained when polymer-polyols are produced with various styrene/acrylonitrile ratios and in the absence of adducts of the invention. The results are summarized in Table 13. The resultant polymer-polyols were either coagulated, or contained some coagulums or grits. The high-viscosity paste in trial 81 could only be used after dilution, e.g., with a polyol.

TABLE 13

| TRIAL | 75 | 76 | 77 | 78 | 79 | 80 | 81 |
|---|---|---|---|---|---|---|---|
| POLYOL OR POLYOL BLEND | III/I | III/I | III/I | I | III/I | II | II |
| BLEND RATIO | 85/15 | 85/15 | 70/30 | — | 85/15 | — | — |
| POLYOL USED (grams) | 500 | 500 | 500 | 516 | 500 | 516 | 516 |
| MONOMER USED (grams) | 237.7 | 166.9 | 237.7 | 223.37 | 223.37 | 223.37 | 223.37 |
| MONOMER BLEND RATIO (Styrene/Acrylonitrile) | 70/30 | 60/40 | 60/40 | 60/40 | 60/40 | 60/40 | 70/30 |
| % MONOMER USED | 32.0 | 24.3 | 32.0 | 30.0 | 30.0 | 30.0 | 30.0 |
| CATALYST CONTENT (grams) | 5.1 | 5.1 | 5.1 | 5.21 | 5.21 | 5.21 | 5.21 |
| TOTAL POLYMER IN PRODUCT | 30.9 | 23.1 | — | 29.3 | 28.7 | 29.1 | 29.3 |
| VISCOSITY (cps) | Coagulated | 4,500 | Coagulated | 7,000 | 8,000 | 35,000 | High-Viscosity Paste |
| PARTICLE SIZE | — | Small, Some Coagulums | — | Borderline of Invisibility, Some Coagulums | Very Small, Some Grits | Small, Some Coagulums | — |

DISAPPEARANCE OF ETHYLENIC UNSATURATION DURING ADDUCT PRODUCTION

EXAMPLE 21

Example 21 shows that, under the reaction conditions used in the practice of the invention, i.e., a maximum reaction temperature of about 160°–180° C., preferably about 170° C., ethylenic unsaturation disappears during the production of adducts between polycarboxylic acids or anhydrides and polyols, even when an unsaturated dibasic acid anhydride is employed. Table 14 shows the results of the trial.

Maleic anhydride (49 grams, 0.5 mole) was added to polyol II (1500 grams, 0.25 mole) by stirring under nitrogen at 70° C. until it was dissolved and reaction began. Samples 1-5 were taken at various times while the reaction continued and while the solution temperature was increased from 70° to 170° C. The samples were tested for acid number and unsaturation (three trials for unsaturation are reported in the table for each sample). The results for sample 5, the last sample taken, showed the acid number as determined by the KOH method to be approximately 10.0, and as shown in the Table, the unsaturation at that point had virtually disappeared.

TABLE 14

| SAMPLE | TOTAL HEATING TIME | TEMPERATURE °C. | VISCOSITY (cps) | UNSATURATION mg/gm MERCAPTAN METHOD | ACID NO. (KOH EQUIVALENT) |
|---|---|---|---|---|---|
| 1 | .33 Hours | 70 | 1200 | 0.3400<br>0.3600<br>0.3400 | 19.9 |
| 2 | 17 Hours | 90 | 2040 | 0.1120<br>0.1101<br>0.1145 | 18.0 |
| 3 | 24.5 Hours | 160 | 2280 | 0.1000<br>0.0920<br>0.0977 | 16.5 |
| 4 | 43 Hours | 115 | 3300 | 0.0820<br>0.0750<br>0.0770 | 12.2 |
| 5 | 49 Hours (Half Ester) | 170 | 5800 | 0.0620<br>0.0550<br>0.0620 | 10.0 |

EXAMPLES SHOWING THE UTILITY OF THE ADDUCTS WHEN USED IN PROPER PROPORTIONS

EXAMPLE 22

A series of trials (see Table 15) was conducted to compare (a) polymer-polyols prepared by combining monomeric maleic anhydride directly with styrene, acrylonitrile and a polyol blend [trials 82–85] with (b) polymer-polyols prepared by first producing an adduct of polyol I reacted with an intermediate (formed by 1:1 molar equivalent reaction between maleic anhydride and 1,3-butylene glycol), and then combining the adduct with styrene/acrylonitrile and a polyol blend [trials 86–88]. The polyol blend used was (Niax 16-56)/(Niax 11-27) in an 85:15 weight ratio. These trials showed that polymer-polyols prepared with the adducts uniformly gave smaller particle size than the polymer-polyols prepared with direct addition of maleic anhydride. In trial 88, the ethylenically unsaturated monomer used was 100% styrene, yet a polymer-polyol with excellent particle size bordering on invisibility under a microscope (maximum particle size of less than about 1 micron diameter) was produced.

TABLE 15

| TRIAL | 82 | 83 | 84 | 85 | 86 | 87 | 88 |
|---|---|---|---|---|---|---|---|
| REACTANT | None | MA | MA | MA | (Adduct) | (Adduct) | (Adduct) |
| Grams/100 Grams Polyol | None | 0.47 | 0.47 | 0.47 | 0.47 | 0.47 | 0.47 |
| Adduct Used | None | None | None | None | A | A | A |
| % ADDUCT USED | None | None | None | None | 10% | 10% | 10% |
| STYRENE/ACRYLONITRILE RATIO (Weight %) | 80/20 | 70/30 | 80/20 | 100/0 | 70/30 | 80/20 | 100/0 |
| MONOMER USED | 30% | 30% | 30% | 30% | 30% | 30% | 30% |
| VISCOSITY (cps) | 1,900 | 15,000 | Coagulated | 3,000 | 5,000 | 5,200 | 5,500 |
| PARTICLE SIZE | Medium, Some Large | Small | Coagulated | Very Large, Some Coagulated | Borderline Of Visibility | Borderline Of Visibility | Borderline Of Visibility |
| % FREE MONOMER | 0.91% | 1.06% | — | 0.91% | 0.81% | 0.96% | 0.96% |

A = An Adduct of [(Polyol I) and (Maleic Anhydride - 1,3-Butylene Glycol)]
MA = Maleic Anhydride

EXAMPLE 23

A series of trials was carried out to demonstrate the role of an adduct concentration of about 5–10% in the polymer-polyols of the invention. Where blends of polyols were used, the Niax polyols are shown as a fraction, e.g., 16–56/11–27. The weight ratio in these polyol blends is 85/15.

Table 16 (trials 89–96), summarizes control trials in which monomeric ERL 4221 diepoxide and monomeric maleic anhydride were combined with polyols in an attempt to produce polymer-polyols. The particle size data show that the results in these trials were poor.

Table 17 (trials 97–103), summarizes trials in which adducts were first prepared and then added to the monomers and additional polyol to produce polymer-polyols. The percentage of adduct used in the polymer-polyols was 10%. No adduct was used in trial 97. In trials 98–99, an adduct formed by reaction between 11–27 polyol and one of the epoxy groups of ERL-4221 was used. In trials 100-101, an adduct formed by reaction between 11-27 polyol and an intermediate, the intermediate being formed by 1:1 molar equivalent reaction between maleic anhydride and 1,3-butylene glycol was used. In trials 102 and 103, respectively, 2,3-butylene glycol and ethylene glycol were substituted for the 1,3-butylene glycol used in trials 100-101. Trials 97-98 gave acceptable results; trial 99 (where 100% styrene as the ethylenically unsaturated monomer was used) resulted in coagulation. The polymer-polyols in trials 100-103 all were characterized by particle size bordering on invisibility under the microscope.

In Table 18 (trials 104-111), the percentage of adduct used to make the polymer-polyols was reduced to 5%. Trials 104 and 105 were controls in which no adduct was used. In trials 106-111, an adduct formed by reaction between 11-27 polyol and an intermediate, the intermediate being formed by 1:1 molar equivalent reaction between maleic anhydride and 1,3-butylene glycol, was used. The particle size of the polymer-polyols in trials 106-111 (where 5% of adduct was used), was very good. In trials 107-108, Niax LG-56 polyol (polyol IV), a very low molecular weight polyol, was used. Nevertheless, polymer-polyols of very small particle size were produced.

In Table 19 (trials 112-117) the adduct content in the polymer-polyols was increased to 20%. Trials 112-113 were controls in which no adduct was used. In trials 114-117, the adduct used was produced by reaction of a polyol with an intermediate, the intermediate formed by 1:1 molar reaction between maleic anhydride and 1,3-butylene glycol. The only trial where complete coagulation was not encountered was trial 112, a control trial using a blended polyol and no adduct.

The trials summarized in Table 17 show that good results are obtained when approximately 10% adduct concentration is employed in making a polymer-polyol. The results in Table 18 show that a 5% adduct content also gave good results. The trials reported in Table 19 (where 20% adduct was used), gave less acceptable results and showed that such a high adduct content in polymer-polyols probably is not advisable. The control trials shown in Table 16 showed that adducts yield improved polymer-polyols of better particle size.

TABLE 16

| TRIAL | 89 | 90 | 91 | 92 | 93 | 94 | 95 | 96 |
|---|---|---|---|---|---|---|---|---|
| POLYOL USED | 16-56/11-27 | 16-56/11-27 | 16-56/11-27 | 11-27 | 11-27 | 11-27 | 16-56/11-27 | 11-27 |
| REACTANT | — | (ERL 4221) | (ERL 4221) | (ERL 4221) | (MA) | (MA) | (MA) | (MA) |
| Grams/100 Grams Polyol | None | 0.32 | 0.32 | 0.32 | 0.47 | 0.47 | 0.47 | 0.47 |
| STYRENE/ACRYLONITRILE RATIO | 80/20 | 80/20 | 80/20 | 100/0 | 70/30 | 80/20 | 80/20 | 100/0 |
| MONOMER USED | 30% | 30% | 30% | 30% | 30% | 30% | 30% | 30% |
| VISCOSITY OF POLYMER (cps) | 1,900 | 2,300 | 2,000 | 100% Coagulated | 15,000 | 100,000 | 100% Coagulated | 3,000 |
| PARTICLE SIZE | Medium, Some Large | Coagulums | Coagulums | 100% Coagulated | Small With Flocks | Large, With Flocks | 100% Coagulated | Coaglums |
| % FREE MONOMER | 0.91 | 0.89 | 0.91 | — | 1.06 | 0.99 | — | 0.91 |

MA = Maleic Anhydride

TABLE 17

| TRIAL | 97 | 98 | 99 | 100 | 101 | 102 | 103 |
|---|---|---|---|---|---|---|---|
| POLY USED | 16-56/11-27 | 16-56/11-27 | 11-27 | 16-56/11-27 | 16-56/11-27 | 16-56/11-27 | 16-56/11-27 |
| GRAMS REACTANT/100 Grams Polyol | None | 0.32 | 0.32 | 0.47 | 0.47 | 0.47 | 0.47 |
| ADDUCT USED | None | (ERL-4221)/11-27 Polyol | (ERL-4221)/11-27 Polyol | MA/1,3BG/11-27 | MA/1,3-BG/11-27 | MA/2,3-BG/11-27 | MA/EG/11-27 |
| % ADDUCT USED | None | 10% | 10% | 10% | 10% | 10% | 10% |
| STYRENE/ACRYLONITRILE RATIO | 80/20 | 80/20 | 100/0 | 70/30 | 80/20 | 80/20 | 80/20 |
| % MONOMER USED | 30% | 30% | 30% | 30% | 30% | 30% | 30% |
| VISCOSITY | 1,900 | 1,840 | — | 5,000 | 5,200 | 8,000 | 5,500 |
| PARTICAL SIZE | Medium, Some Large | Borderline of Visibility | 40% Coagulated | Borderline of Visibility | Borderline of Visibility | Borderline of Visibility | Borderline of Visibility |
| % FREE MONOMER | 0.91 | 0.83 | 0.91 | 0.81 | 0.96 | 0.97 | 0.96 |

MA = Maleic Anhydride
1,3-BG = 1,3-Butylene Glycol
2,3-BG = 2,3 Butylene Glycol
EG = Ethylene Glycol

TABLE 18

| TRIAL | 104 | 105 | 106 | 107 | 108 | 109 | 110 | 111 |
|---|---|---|---|---|---|---|---|---|
| POLYOL USED | 16-56/11-27 | 16-56 | 16-56/11-27 | LG-56/11-27 | LG-56 | 16-56 | 16-56 | 16-56 |
| GRAMS REACTANT/100 Grams Polyol | None | None | 0.47 | 0.47 | 0.47 | 0.47 | 0.47 | 0.47 |

TABLE 18-continued

| TRIAL | 104 | 105 | 106 | 107 | 108 | 109 | 110 | 111 |
|---|---|---|---|---|---|---|---|---|
| ADDUCT USED | None | None | MA/1,3-BG | MA/1,3-BG | MA/1,3-BG | MA/1,3-BG | MA/1,3-BG | MA/1,3-BG |
| % ADDUCT USED | None | None | 5% | 5% | 5% | 5% | 5% | 5% |
| STYRENE/ACRYLONITRILE RATIO | 80/20 | 80/20 | 80/20 | 80/20 | 70/30 | 70/30 | 80/20 | 100/0 |
| % MONOMER USED | 30% | 30% | 30% | 30% | 30% | 30% | 30% | 30% |
| VISCOSITY | 1,900 | Coagulated | 2,700 | 3,700 | 5,200 | 1,920 | 1,620 | 1,220 |
| PARTICLE SIZE | Medium, Some Large | Coagulated | Borderline of Visibility | Very Small | Very Small | Borderline of Visibilty | Borderline of Visibility | Borderline of Visibility |
| % FREE MONOMER | 0.91 | — | 0.92 | 0.87 | 0.91 | 0.89 | 0.96 | 0.89 |

MA = Maleic Anhydride
1,3-BG = (1,3-Butylene Glycol)

TABLE 19

| TRIAL | 112 | 113 | 114 | 115 | 116 | 117 |
|---|---|---|---|---|---|---|
| POLYOL USED | 16-56/11-27 | 16-56 | 16-56/11-27 | LG-56/11-27 | LG-56/11-27 | 16-56 |
| GRAMS REACTANT/100 Grams Polyol | None | None | 0.94 | 0.94 | 0.94 | 0.94 |
| ADDUCT USED | None | None | MA/1,3-BG | MA/1,3-BG | MA/1,3-BG | MA/1,3-BG |
| % ADDUCT USED | None | None | 20% | 20% | 20% | 20% |
| STYRENE/ACRYLONITRILE RATIO | 80/20 | 80/20 | 80/20 | 80/20 | 70/30 | 80/20 |
| MONOMER USED | 30% | 30% | 30% | 30% | 30% | 30% |
| VISCOSITY | 1,900 | Coagulated | Coagulated | Coagulated | Coagulated | Coagulated |
| PARTICLE SIZE | Medium, Some Large | Coagulated | Coagulated | Coagulated | Coagulated | Coagulated |
| % FREE MONOMER | 0.91 | — | — | — | — | — |

1,3-BG = (1,3-Butylene Glycol)
MA = Maleic Anhydride

EXAMPLE 24

A series of trials was carried out generally using techniques described in Example 23 to demonstrate the advantages derived by employing adduct concentrations of about 10% in the invention where adducts are combined directly with polyisocyanates to produce polyurethane foams, without first producing polymer-polyols.

Trial 118 was a control in which no adduct was used. Trials 119, 122 and 125 employed a (polyol 11-27) (maleic anhydride) half-ester adduct. Trials 120, 123 and 126 employed an adduct produced by first reacting ethylene glycol with maleic anhydride to produce a half-ester intermediate, and then reacting the free carboxyl groups of the intermediate with polyol 11-27 to produce an adduct. Trials 121, 124 and 127 employed an adduct produced similarly from an intermediate half-ester in which the ethylene glycol was replaced by 1,3-butylene glycol. In trials 119-121, 2.5% adduct was used based on combined weight of (adduct and polyol blend). Trials 122-124 and 125-127 similarly employed 5% and 10% adduct, respectively. Generally, ILD and TES increased for the three types of adducts used as the percentage of adduct present in the adduct-polyol blend was increased from 2.5% to 5% to 10%. (See Tables 20A-20B).

TABLE 20A

| TRIAL | 118 (Control) | 119 | 120 | 121 | 122 |
|---|---|---|---|---|---|
| POLYOL BLEND USED | 16-56/11-27 | 16-56/11-27 | 16-56/11-27 | 16-56/11-27 | 16-56/11-27 |
| POLYOL BLEND RATIO (By Weight) | 85/15 | 85/15 | 85/15 | 85/15 | 85/15 |
| ADDUCT (Polyol/Reactant) | — | 11-27/MA | 11-27/EG-MA | 11-27/1,3-BG-MA | 11-27/MA |
| GRAMS REACTANT/100 GRAMS POLYOL | — | 0.013 | 0.009 | 0.011 | 0.026 |
| % ADDUCT USED | — | 2.5% | 2.5% | 2.5% | 5% |
| ADDUCT VISCOSITY (cps) | 590.8 | 1,880 | 5,500 | 17,000 | 1,880 |
| KOH (mg/g) | 0.00 | 8.7 | 1.2 | 1.0 | 8.7 |
| UNSATURATION (mmol/g) | 0.00 | 0.01 | 0.00 | 0.03 | 0.01 |
| FOAM DENSITY (g/cm$^3$) | 1.80 | 1.81 | 1.80 | 1.77 | 1.78 |
| ILD (lbs/sq. inch) 25% | 21.7 | 22.3 | 23.2 | 23.4 | 30.9 |
| % INCREASE | — | 2.8% | 6.9% | 7.8% | 42.4% |
| 65% | 33.3 | 30.9 | 37.3 | 39.4 | 62.3 |
| % INCREASE | — | −7.2% | 12.0% | 18.3% | 87.1% |
| TENSILE STRENGTH (lbs/sq. inch G) | 584.7 | 591.3 | 587.2 | 592.0 | 597.0 |

TABLE 20A-continued

| TRIAL | 118 (Control) | 119 | 120 | 121 | 122 |
|---|---|---|---|---|---|
| % INCREASE | — | 1.1% | 0.4% | 1.2% | 2.1% |

MA = Maleic Anhydride
EG = Ethylene Glycol
1,3-BG = 1-3-Butylene Glycol

TABLE 20B

| TRIAL | 123 | 124 | 125 | 126 | 127 |
|---|---|---|---|---|---|
| POLYOL BLEND USED | 16–56/11–27 | 16–56/11–27 | 16–56/11–27 | 16–56/11–27 | 16–56/11–27 |
| POLYOL BLEND RATIO (By Weight) | 85/15 | 85/15 | 85/15 | 85/15 | 85/15 |
| ADDUCT (Polyol/Reactant) | 11–27/EG-MA | 11–27/1,3-BG-MA | 11–27/MA | 11–27/EG-MA | 11–27/1,3-BG-MA |
| GRAMS REACTANT/ 100 GRAMS POLYOL | 0.018 | 0.023 | 0.053 | 0.037 | 0.046 |
| % ADDUCT USED | 5% | 5% | 10% | 10% | 10% |
| ADDUCT VISCOSITY (cps) | 5,500 | 17,000 | 1,880 | 5,500 | 17,000 |
| KOH (mg/g) | 1.2 | 1.0 | 8.7 | 1.2 | 1.3 |
| UNSATURATION (mmol/g) | 0.00 | 0.03 | 0.01 | 0.00 | 0.03 |
| FOAM DENSITY (g/cm$^3$) | 1.80 | 1.70 | 2.30 | 2.00 | 1.92 |
| ILD (lbs/sq. inch) 25% | 32.6 | 31.2 | 32.7 | 33.1 | 32.8 |
| % INCREASE | 50.2% | 43.8% | 50.7% | 52.5% | 51.2% |
| 65% | 67.2 | 70.7 | 63.1 | 67.8 | 71.2 |
| % INCREASE | 101.8% | 112.3% | 89.5% | 103.6% | 113.8% |
| TENSILE STRENGTH (lbs/sq. inch G) | 607.3 | 601.2 | 600.1 | 617.8 | 623.1 |
| % INCREASE | 3.9% | 2.8% | 2.6% | 5.7% | 6.6% |

MA = Maleic Anhydride
EG = Ethylene Glycol
1,3-BG = 1-3-Butylene Glycol

While the preferred embodiments of this invention have been discussed above and illustrated by the Examples, it is to be understood that modifications in the invention may be made as known to those skilled in the art.

I claim:

1. A polyurethane which is the reaction product of a mixture comprising an organic polyisocyanate and an adduct formed by reaction of a polyol with a co-reactant, the co-reactant being selected from the group consisting of:

(A) a half-ester co-reactant formed by 1:1 molar reaction between:
  (1) at least one polyhydroxyhydrocarbon having a molecular weight below about 200, and
  (2) at least one polycarboxylic compound selected from the group consisting of dicarboxylic acids, dicarboxylic acid anhydrides, polycarboxylic acids having at least three carboxylic carbon atoms, and polycarboxylic anhydrides having at least three carboxylic carbon atoms,
  in which at least one of the carboxylic carbon atoms of the poly-carboxylic compound remains unreacted after the 1:1 molar reaction;

(B) an epoxy co-reactant selected from the group consisting of diepoxides, polyepoxides having more than two epoxy groups and mixtures, in which at least one of the epoxy groups in the epoxy co-reactant remains unreacted after reaction with the polyol; and (C) a half-ester co-reactant formed by 1:1 molar reaction between:
  (1) at least one polycarboxylic compound selected from the group consisting of dicarboxylic acids, dicarboxylic acid anhydrides, polycarboxylic acids having at least three carboxylic carbon atoms, and polycarboxylic anhydrides having at least three carboxylic carbon atoms, and
  (2) at least one epoxy compound selected from the group consisting of diepoxides and polyepoxides having at least three epoxy groups,
  in which at least one of the epoxy groups of the epoxy compound remains unreacted after the 1:1 molar reaction.

2. The polyurethane of claim 1 in which the co-reactant is:
a half-ester co-reactant formed by 1:1 molar reaction between at least one polyhydroxyhydrocarbon having a molecular weight below about 200 and at least one poly-carboxylic compound selected from the group consisting of dicarboxylic acids, dicarboxylic acid anhydrides, polycarboxylic acids having at least three carboxylic carbon atoms, and polycarboxylic anhydrides having at least three carboxylic carbon atoms,
in which at least one of the carboxylic carbon atoms of the polycarboxylic compound remains unreacted after the 1:1 molar reaction.

3. The polyurethane of claim 1 in which the co-reactant is:
an epoxy co-reactant selected from the group consisting of diepoxides, polyepoxides having more than two epoxy groups and mixtures,
in which at least one of the epoxy groups in the epoxy co-reactant remains unreacted after the reaction with the polyol.

4. The polyurethane of claim 1 in which the co-reactant is:
a half-ester co-reactant formed by 1:1 molar reaction between (1) at least one polycarboxylic compound selected from the group consisting of dicarboxylic acids, dicarboxylic acid anhydrides, polycarboxylic acids having at least three carboxylic carbon atoms, and polycarboxylic anhydrides having at least three carboxylic carbon atoms, and (2) at least one epoxy compound selected from the group consisting of diepoxides and polyepoxides having at least three epoxy groups, in which at least one of the epoxy groups of the epoxy compound remains unreacted after the 1:1 molar reaction.

5. The polyurethane of claim 1 in which the mixture comprises:
   (A) a minor amount of the adduct;
   (B) a major amount of a second polyol; and
   (C) an organic polyisocyanate.

6. The polyurethane of claim 5 in which the mixture comprises an effective amount of a blowing agent.

7. A method of producing a polyurethane comprising copolymerizing a mixture comprising an organic polyisocyanate and an adduct, the adduct being formed by reaction of a polyol with a co-reactant selected from the group consisting of:
   (A) a half-ester co-reactant formed by 1:1 molar reaction between:
      (1) at least one polyhydroxyhydrocarbon having a molecular weight below about 200, and
      (2) at least one polycarboxylic compound selected from the group consisting of dicarboxylic acids, dicarboxylic acid anhydrides, polycarboxylic acids having at least three carbon atoms, and polycarboxylic anhydrides having at least three carboxylic carbon atoms,
   in which at least one of the carboxylic carbon atoms of the polycarboxylic compound remains unreacted after the 1:1 molar reaction;
   (B) an epoxy co-reactant selected from the group consisting of diepoxides, polyepoxides having more than two epoxy groups and mixtures,
   in which at least one of the epoxy groups in the epoxy co-reactant remains unreacted after the reaction with the polyol; and
   (C) a half-ester co-reactant formed by 1:1 molar reaction between:
      (1) at least one polycarboxylic compound selected from the group consisting of dicarboxylic acids, dicarboxylic acid anhydrides, polycarboxylic acids having at least three carboxylic carbon atoms, and polycarboxylic anhydrides having at least three carboxylic carbon atoms, and
      (2) at least one epoxy compound selected from the group consisting of diepoxides and polyepoxides having at least three epoxy groups,
   in which at least one of the epoxy groups of the epoxy compound remains unreacted after the 1:1 molar reaction.

8. The method of claim 7 comprising copolymerizing:
   (A) a minor amount of the adduct;
   (B) a major amount of a second polyol; and
   (C) an organic polyisocyanate.

9. The method of claim 8 in which the mixture is copolymerized in the presence of an effective amount of a blowing agent to produce a polyurethane foam.

* * * * *